US011350384B2

(12) United States Patent
Tie et al.

(10) Patent No.: US 11,350,384 B2
(45) Date of Patent: May 31, 2022

(54) METHOD AND DEVICE FOR INSTRUCTING A USER EQUIPMENT TO MONITOR A DOWNLINK INFORMATION

(71) Applicant: Huawei Technologies Co., Ltd., Shenzhen (CN)

(72) Inventors: Xiaolei Tie, Shanghai (CN); Feng Yu, Beijing (CN); Steven James Wenham, Cambridge (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 16/831,362

(22) Filed: Mar. 26, 2020

(65) Prior Publication Data

US 2020/0236650 A1    Jul. 23, 2020

Related U.S. Application Data

(63) Continuation of application No. 15/881,230, filed on Jan. 26, 2018, now Pat. No. 10,645,670, which is a
(Continued)

(51) Int. Cl.
*H04W 68/02* (2009.01)
*H04W 68/00* (2009.01)
(Continued)

(52) U.S. Cl.
CPC ............ *H04W 68/02* (2013.01); *H04W 4/70* (2018.02); *H04W 52/0216* (2013.01);
(Continued)

(58) Field of Classification Search
CPC . H04W 68/025; H04W 4/70; H04W 52/0216; H04W 52/0229; H04W 68/00;
(Continued)

(56) References Cited

U.S. PATENT DOCUMENTS 6,339,588 B1    1/2002   Katsuragawa
8,509,821 B1 *  8/2013   Zang ................. H04W 68/025
                                                          455/458
(Continued)

FOREIGN PATENT DOCUMENTS

CN    101309497 A    11/2008
CN    101437092 A     5/2009
(Continued)

OTHER PUBLICATIONS

"NB M2M—Discussions on paging procedure," 3GPP GERAN2 Meeting #66 Vilnius, Lithuania, Tdoc GP-150382, 3rd Generation Partnership Project, Valbonne, France (May 25-28, 2015).
(Continued)

*Primary Examiner* — Dung B Huynh
(74) *Attorney, Agent, or Firm* — Leydig, Voit & Mayer, Ltd.

(57) ABSTRACT

An information transmission method and a related device are provided. The method includes: determining, by a base station, to send downlink information to P user equipments of at least one user equipment within a first time period; generating, by the base station, an indication field according to the determined P user equipments, where the indication field includes M bits, each of the at least one user equipment is corresponding to K bits of the M bits, the K bits are used to indicate whether the corresponding user equipment needs to receive and read the downlink information sent by the base station within the first time period, K is a positive integer greater than 1 and less than M, and P is an integer greater than or equal to 0; and sending, by the base station, the indication field to the at least one user equipment.

18 Claims, 8 Drawing Sheets

Related U.S. Application Data continuation of application No. PCT/CN2015/085198, filed on Jul. 27, 2015.

(51) Int. Cl.
*H04W 52/02* (2009.01)
*H04W 4/70* (2018.01)
*H04W 72/04* (2009.01)

(52) U.S. Cl.
CPC ....... *H04W 52/0229* (2013.01); *H04W 68/00* (2013.01); *H04W 68/025* (2013.01); *H04W 72/042* (2013.01); *Y02D 30/70* (2020.08)

(58) Field of Classification Search
CPC .... H04W 68/02; H04W 72/042; Y02D 30/70; Y02D 70/1224; Y02D 70/1242; Y02D 70/1262; Y02D 70/142; Y02D 70/144; Y02D 70/146
See application file for complete search history.

(56) References Cited

U.S. PATENT DOCUMENTS

| | | | | |
|---|---|---|---|---|
| 8,576,880 | B1* | 11/2013 | Vargantwar | H04W 68/025 370/476 |
| 8,768,385 | B2 | 7/2014 | Chandramouli et al. | |
| 9,065,616 | B2 | 6/2015 | Park et al. | |
| 10,200,968 | B2* | 2/2019 | Shen | H04W 68/005 |
| 2001/0018343 | A1 | 8/2001 | Nakata | |
| 2002/0090959 | A1* | 7/2002 | Laroia | H04W 68/02 455/458 |
| 2002/0093920 | A1 | 7/2002 | Neufeld et al. | |
| 2004/0147271 | A1 | 7/2004 | Billon et al. | |
| 2005/0277429 | A1* | 12/2005 | Laroia | H04W 68/025 455/458 |
| 2006/0285485 | A1* | 12/2006 | Agrawal | H04W 68/00 370/208 |
| 2007/0015523 | A1* | 1/2007 | Prakash | H04W 68/02 455/458 |
| 2008/0057982 | A1* | 3/2008 | Willey | H04W 68/025 455/458 |
| 2008/0057984 | A1* | 3/2008 | Willey | H04W 68/025 455/458 |
| 2008/0057986 | A1* | 3/2008 | Willey | H04W 68/025 455/466 |
| 2008/0062178 | A1 | 3/2008 | Khandekar et al. | |
| 2008/0064418 | A1* | 3/2008 | Willey | H04W 68/025 455/458 |
| 2008/0188248 | A1 | 8/2008 | Willey et al. | |
| 2008/0268877 | A1* | 10/2008 | Harris | H04W 68/025 455/458 |
| 2009/0176515 | A1 | 7/2009 | Willey et al. | |
| 2009/0182871 | A1* | 7/2009 | Gupta | H04W 68/06 709/224 |
| 2009/0303953 | A1 | 12/2009 | Kang et al. | |
| 2010/0062795 | A1* | 3/2010 | Lee | H04W 68/025 455/458 |
| 2010/0135159 | A1* | 6/2010 | Chun | H04W 52/0216 370/241 |
| 2010/0165927 | A1 | 7/2010 | Kim et al. | |
| 2010/0248749 | A1 | 9/2010 | Koo et al. | |
| 2010/0248750 | A1* | 9/2010 | Muller | H04W 68/02 455/458 |
| 2010/0248752 | A1 | 9/2010 | Yu | |
| 2011/0002081 | A1* | 1/2011 | Taylor | H01G 13/00 361/301.2 |
| 2011/0274070 | A1 | 11/2011 | Xia et al. | |
| 2012/0076085 | A1 | 3/2012 | Chou | |
| 2012/0115485 | A1* | 5/2012 | Narasimha | H04W 68/02 455/437 |
| 2012/0184205 | A1* | 7/2012 | Luft | H04W 68/00 455/9 |
| 2012/0188903 | A1* | 7/2012 | Futaki | H04W 72/1273 370/252 |
| 2012/0275366 | A1* | 11/2012 | Anderson | H04W 68/025 370/311 |
| 2013/0051296 | A1 | 2/2013 | Park et al. | |
| 2013/0064151 | A1 | 3/2013 | Mujtaba et al. | |
| 2013/0115977 | A1 | 5/2013 | Chandramouli et al. | |
| 2013/0250883 | A1 | 9/2013 | Guo et al. | |
| 2013/0301611 | A1* | 11/2013 | Baghel | H04W 74/0833 370/331 |
| 2013/0315092 | A1* | 11/2013 | Yu | H04W 52/0216 370/252 |
| 2013/0324122 | A1 | 12/2013 | Lee et al. | |
| 2013/0329616 | A1 | 12/2013 | Attar | |
| 2013/0329642 | A1 | 12/2013 | Yu | |
| 2013/0336253 | A1 | 12/2013 | Lee | |
| 2014/0010131 | A1* | 1/2014 | Gaal | H04L 5/001 370/311 |
| 2014/0010212 | A1* | 1/2014 | McNamara | H04W 72/042 370/336 |
| 2014/0038647 | A1 | 2/2014 | Zhang et al. | |
| 2014/0119198 | A1* | 5/2014 | Lee | H04L 1/1812 370/241 |
| 2014/0192703 | A1 | 7/2014 | Chun et al. | |
| 2014/0198685 | A1 | 7/2014 | Xu et al. | |
| 2014/0198696 | A1* | 7/2014 | Li | H04W 52/0229 370/311 |
| 2014/0254452 | A1* | 9/2014 | Golitschek Edler Von Elbwart | H04W 52/0219 370/311 |
| 2014/0369399 | A1 | 12/2014 | Nagase | |
| 2015/0003311 | A1* | 1/2015 | Feuersaenger | H04W 72/042 370/311 |
| 2015/0031382 | A1* | 1/2015 | Damnjanovic | H04W 68/025 455/452.1 |
| 2015/0043408 | A1* | 2/2015 | Morioka | H04W 4/70 370/311 |
| 2015/0085780 | A1 | 3/2015 | Kim et al. | |
| 2015/0103768 | A1 | 4/2015 | Chen et al. | |
| 2015/0201456 | A1* | 7/2015 | Lee | H04W 72/042 370/311 |
| 2015/0305075 | A1 | 10/2015 | Fodor et al. | |
| 2015/0327046 | A1 | 11/2015 | Lee et al. | |
| 2015/0334555 | A1* | 11/2015 | Seo | H04W 24/10 370/254 |
| 2015/0365942 | A1* | 12/2015 | Niu | H04W 48/14 370/330 |
| 2016/0014716 | A1* | 1/2016 | Tabet | H04W 68/005 455/458 |
| 2016/0014718 | A1* | 1/2016 | Mysore Balasubramanya | H04W 52/0216 455/458 |
| 2016/0021641 | A1 | 1/2016 | Nogami et al. | |
| 2016/0029354 | A1 | 1/2016 | Lyu et al. | |
| 2016/0057738 | A1* | 2/2016 | Lee | H04W 72/042 370/329 |
| 2016/0066296 | A1 | 3/2016 | Su et al. | |
| 2016/0100422 | A1 | 4/2016 | Papasakellariou et al. | |
| 2016/0105860 | A1* | 4/2016 | Li | H04W 74/0833 370/350 |
| 2016/0219607 | A1* | 7/2016 | You | H04L 5/0053 |
| 2016/0227514 | A1* | 8/2016 | Burbidge | H04W 76/27 |
| 2017/0171690 | A1* | 6/2017 | Kim | H04L 51/02 |
| 2017/0280481 | A1 | 9/2017 | Stern-Berkowitz et al. | |
| 2017/0303216 | A1* | 10/2017 | Seo | H04W 52/383 |
| 2017/0325193 | A1 | 11/2017 | Xiong et al. | |
| 2017/0359801 | A1 | 12/2017 | Chen et al. | |
| 2018/0098287 | A1* | 4/2018 | Ang | H04W 76/28 |
| 2018/0176881 | A1 | 6/2018 | Tirronen et al. | |
| 2018/0302810 | A1* | 10/2018 | Fujishiro | H04W 76/28 |
| 2020/0351841 | A1* | 11/2020 | Cirik | H04L 5/0048 |
| 2021/0058894 | A1* | 2/2021 | Wang | H04L 69/04 |
| 2021/0153047 | A1* | 5/2021 | Jiang | H04W 72/0466 |
| 2021/0250896 | A1* | 8/2021 | Kim | H04W 76/28 |
| 2021/0274503 | A1* | 9/2021 | Farag | H04L 1/00 |

(56) References Cited

U.S. PATENT DOCUMENTS

2021/0329588 A1* 10/2021 Jia ........................ H04W 68/00
2021/0392630 A1* 12/2021 Ying ........................ H04L 5/00

FOREIGN PATENT DOCUMENTS

| | | |
|---|---|---|
| CN | 103037481 A | 4/2013 |
| CN | 104054320 A | 9/2014 |
| WO | 2008022503 A1 | 2/2008 |

OTHER PUBLICATIONS

U.S. Appl. No. 15/881,230, filed Jan. 26, 2018.

* cited by examiner

METHOD AND DEVICE FOR INSTRUCTING A USER EQUIPMENT TO MONITOR A DOWNLINK INFORMATION

CROSS-REFERENCE TO RELATED APPLICATIONS

This application is a continuation of U.S. patent application Ser. No. 15/881,230, filed on Jan. 26, 2018, which is a continuation of International Application No. PCT/CN2015/085198, filed on Jul. 27, 2015. All of the afore-mentioned patent applications are hereby incorporated by reference in their entireties.

TECHNICAL FIELD

Embodiments of the present invention relate to the field of communications technologies, and more specifically, to an information transmission method and a device.

BACKGROUND

Machine type communication (MTC) will be an important application in the future communications field. The MTC may be applied to smart metering, medical detection, logistics detection, fire monitoring, wearable device communication, and the like. In the MTC, user equipment generally has relatively low power consumption, so as to increase a standby time of the user equipment, and reduce labor costs for changing a battery.

To reduce user equipment power consumption, when the user equipment does not need to send uplink data or currently has no downlink service, the user equipment enters an idle state. In the idle state, the user equipment may enter a long-term sleep mode, that is, a receiver may be disabled to save power.

However, to balance a power saving effect and a delay to some extent, the user equipment needs to periodically wake up to monitor downlink data that may be received. For example, each idle-state user equipment attempts to receive a paging request message at a paging moment corresponding to the user equipment. However, possibly, most user equipments actually do not receive a paging request message. In this case, the user equipments still need to read all physical downlink control channels (PDCCH), and then can determine that the user equipments are not scheduled at paging moments. This is disadvantageous to reduction of user equipment power consumption. For another example, in a random access procedure, when receiving a random access request sent by user equipment and allowing access for the user equipment, the base station feeds a random access response packet back to the user equipment in N frames. In this case, after sending the random access request, the user equipment successively monitors N frames, receives and decodes all PDCCH signaling or physical downlink shared channel (PDSCH) data packets that may carry a random access response packet, and detects whether the corresponding random access response packet is fed by the base station back to the user equipment. However, because uplink and downlink resources are limited, the base station does not determine a frame that is of the N frames and in which the base station sends the random access response packet to the user equipment. Therefore, the user equipment needs to monitor multiple frames to detect whether the base station feeds the random access response packet back. This is disadvantageous to reduction of user equipment power consumption. For still another example, in a common uplink scheduling and downlink scheduling solution, connected-state user equipment successively monitors several PDCCH scheduling moments to determine whether the user equipment is scheduled. In other words, the user equipment may be scheduled at each scheduling moment, but the user equipment is scheduled only at one scheduling moment. However, in this case, the user equipment still needs to monitor all possible scheduling moments. Therefore, user equipment power consumption is also wasted.

SUMMARY

Embodiments of the present invention provide an information transmission method and a device, so as to reduce user equipment power consumption to save power.

According to a first aspect, an embodiment of the present invention provides an information transmission method, where the method includes: determining, by a base station, to send downlink information to P user equipments of at least one user equipment within a first time period; generating, by the base station, an indication field according to the determined P user equipments, where the indication field includes M bits, each of the at least one user equipment is corresponding to K bits of the M bits, the K bits are used to indicate whether the corresponding user equipment needs to receive and read the downlink information sent by the base station within the first time period, M is a positive integer greater than 1, K is a positive integer greater than 1 and less than M, and P is an integer greater than or equal to 0; and sending, by the base station, the indication field to the at least one user equipment.

With reference to the first aspect, in a first possible implementation of the first aspect, if P is an integer greater than 0, the generating, by the base station, an indication field according to the determined P user equipments includes: determining, by the base station, input information of K preset functions of $i^{th}$ user equipment of the P user equipments, where i=1, ..., P; generating, according to the input information of the K preset functions of the $i^{th}$ user equipment and the K preset functions of the $i^{th}$ user equipment, K numbers corresponding to the $i^{th}$ user equipment, where the K numbers are used to indicate locations of K bits corresponding to the $i^{th}$ user equipment in the M bits; and setting, the bit locations corresponding to the K numbers in the M bits to be acknowledged.

With reference to the first possible implementation of the first aspect, in a second possible implementation of the first aspect, the K preset functions are K preset random functions, and the K numbers are K random numbers; or the K preset functions are K preset hash functions.

With reference to the first possible implementation of the first aspect or the second possible implementation of the first aspect, in a third possible implementation of the first aspect, a type of the downlink information is any one of the following: paging signaling, a random access response used to respond to an uplink random access request, signaling used to schedule user equipment to receive downlink data, or signaling used to instruct user equipment to send uplink data.

With reference to the third possible implementation of the first aspect, in a fourth possible implementation of the first aspect, if the downlink information is the paging signaling, the input information of the K preset functions of the $i^{th}$ user equipment includes at least one of the following: an identifier of the user equipment corresponding to the paging signaling, or system time information.

With reference to the third possible implementation of the first aspect, in a fifth possible implementation of the first aspect, if the downlink information is the random access response used to respond to an uplink random access request, the input information of the K preset functions of the $i^{th}$ user equipment includes at least one of the following: identifier information in the random access request, or system time information.

With reference to the third possible implementation of the first aspect, in a sixth possible implementation of the first aspect, if the downlink information is the signaling used to schedule the $i^{th}$ user equipment to receive downlink data or is the signaling used to instruct the $i^{th}$ user equipment to send uplink data, the input information of the K preset functions of the $i^{th}$ user equipment includes at least one of the following: an identifier of the user equipment corresponding to the signaling, or system time information.

With reference to the first possible implementation of the first aspect or the second possible implementation of the first aspect, in a seventh possible implementation of the first aspect, if the $i^{th}$ user equipment is in an air-interface idle state, the input information of the K preset functions of the $i^{th}$ user equipment includes at least one of the following: an International Mobile Subscriber Identity of the $i^{th}$ user equipment or a temporary logical link identifier of the $i^{th}$ user equipment; or if the $i^{th}$ user equipment is in an air-interface connected state, the input information of the K preset functions of the $i^{th}$ user equipment includes at least a connected-state identifier of the $i^{th}$ user equipment.

With reference to any one of the first possible implementation of the first aspect to the seventh possible implementation of the first aspect, in an eighth possible implementation of the first aspect, before the generating, by the base station according to the input information of the K preset functions of the $i^{th}$ user equipment and the K preset functions of the $i^{th}$ user equipment, K numbers corresponding to the $i^{th}$ user equipment, the method further includes: determining, by the base station, a value of K and a value of M, and sending the values of K and M to the at least one user equipment.

With reference to any one of the first aspect or the foregoing possible implementations of the first aspect, in a ninth possible implementation of the first aspect, the base station sends the indication field to the user equipment on a broadcast channel PBCH and/or a physical downlink control channel PDCCH.

According to a second aspect, an embodiment of the present invention provides an information transmission method, where the method includes: receiving, by user equipment, an indication field that has a length of M bits and that is sent by a base station; and determining, by the user equipment, locations of K bits corresponding to the user equipment in the M bits, where M is a positive integer greater than 1, and K is a positive integer greater than 1 and less than M; and determining, by the user equipment according to values of the K bits, whether to receive and read downlink information sent by the base station within a first time period.

With reference to the second aspect, in a first possible implementation of the second aspect, the determining, by the user equipment, locations of K bits corresponding to the user equipment in the M bits includes: determining, by the user equipment, input information of K preset functions; generating, according to the input information of the K preset functions and the K preset functions, K numbers corresponding to the user equipment, where the K numbers are used to indicate the locations of the K bits corresponding to the user equipment in the M bits; and determining the K bit locations corresponding to the K numbers in the M bits.

With reference to the first possible implementation of the second aspect, in a second possible implementation of the second aspect, the K preset functions are K preset random functions, and the K numbers are K random numbers; or the K preset functions are K preset hash functions.

With reference to any one of the second aspect or the foregoing possible implementations of the second aspect, in a third possible implementation of the second aspect, the determining, by the user equipment according to values of the K bits, whether to receive and read downlink information sent by the base station within a first time period includes: if determining that all the values of the K bits are acknowledged, determining, by the user equipment, to receive and read the downlink information sent by the base station within the first time period; or if determining that at least one of the values of the K bits is unacknowledged, determining, by the user equipment, not to receive or read the downlink information sent by the base station within the first time period.

With reference to any one of the first possible implementation of the second aspect to the third possible implementation of the second aspect, in a fourth possible implementation of the second aspect, a type of the downlink information is any one of the following: paging signaling, a random access response used to respond to an uplink random access request, signaling used to schedule user equipment to receive downlink data, or signaling used to instruct user equipment to send uplink data.

With reference to the fourth possible implementation of the second aspect, in a fifth possible implementation of the second aspect, if the downlink information is the paging signaling, the input information of the K preset functions includes at least one of the following: an identifier of the user equipment or system time information.

With reference to the fourth possible implementation of the second aspect, in a sixth possible implementation of the second aspect, if the downlink information is the random access response used to respond to an uplink random access request, the input information of the K preset functions includes at least one of the following: identifier information in the random access request, or system time information.

With reference to the fourth possible implementation of the second aspect, in a seventh possible implementation of the second aspect, if the downlink information is the signaling used to schedule user equipment to receive downlink data or is the signaling used to instruct user equipment to send uplink data, the input information of the K preset functions includes at least one of the following: an identifier of the user equipment or system time information.

With reference to any one of the first possible implementation of the second aspect to the third possible implementation of the second aspect, in an eighth possible implementation of the second aspect, when the user equipment is in an air-interface idle state, the input information of the K preset functions includes at least one of the following: an International Mobile Subscriber Identity of the user equipment or a temporary logical link identifier of the user equipment; or when the user equipment is in an air-interface connected state, input of the K preset functions is a connected-state identifier of the user equipment.

With reference to any one of the second aspect or the foregoing possible implementations of the second aspect, in a ninth possible implementation of the second aspect, before the generating, according to the input information of the K preset functions and the K preset functions, K numbers corresponding to the user equipment, the method further includes: receiving, by the user equipment, a value of K and a value of M that are sent by the base station.

According to a third aspect, an embodiment of the present invention provides a base station, where the base station includes: a determining unit, configured to determine that the base station sends downlink information to P user equipments of at least one user equipment within a first time period, where the determining unit is further configured to generate an indication field according to the determined P user equipments, where the indication field includes M bits, each of the at least one user equipment is corresponding to K bits of the M bits, the K bits are used to indicate whether the corresponding user equipment needs to receive and read the downlink information sent by the base station within the first time period, M is a positive integer greater than 1, K is a positive integer greater than 1 and less than M, and P is an integer greater than or equal to 0; and a sending unit, configured to send the indication field to the at least one user equipment.

With reference to the third aspect, in a first possible implementation of the third aspect, the determining unit is specifically configured to: determine input information of K preset functions of $i^{th}$ user equipment of the P user equipments, where i=1, . . . , P; generate, according to the input information of the K preset functions of the $i^{th}$ user equipment and the K preset functions of the $i^{th}$ user equipment, K numbers corresponding to the $i^{th}$ user equipment, where the K numbers are used to indicate locations of K bits corresponding to the $i^{th}$ user equipment in the M bits; and set, the bit locations corresponding to the K numbers in the M bits to be acknowledged.

With reference to the first possible implementation of the third aspect, in a second possible implementation of the third aspect, the K preset functions are K preset random functions, and the K numbers are K random numbers; or the K preset functions are K preset hash functions.

With reference to the first possible implementation of the third aspect or the second possible implementation of the third aspect, in a third possible implementation of the third aspect, a type of the downlink information is any one of the following: paging signaling, a random access response used to respond to an uplink random access request, signaling used to schedule user equipment to receive downlink data, or signaling used to instruct user equipment to send uplink data.

With reference to the third possible implementation of the third aspect, in a fourth possible implementation of the third aspect, if the downlink information is the paging signaling, the input information of the K preset functions of the $i^{th}$ user equipment includes at least one of the following: an identifier of the user equipment corresponding to the paging signaling, or system time information.

With reference to the third possible implementation of the third aspect, in a fifth possible implementation of the third aspect, if the downlink information is the random access response used to respond to an uplink random access request, the input information of the K preset functions of the $i^{th}$ user equipment includes at least one of the following: identifier information in the random access request, or system time information.

With reference to the third possible implementation of the third aspect, in a sixth possible implementation of the third aspect, if the downlink information is the signaling used to schedule the user equipment to receive downlink data or is the signaling used to instruct the user equipment to send uplink data, the input information of the K preset functions of the $i^{th}$ user equipment includes at least one of the following: an identifier of the user equipment corresponding to the signaling, or system time information.

With reference to the first possible implementation of the third aspect or the second possible implementation of the third aspect, in a seventh possible implementation of the third aspect, if the $i^{th}$ user equipment is in an air-interface idle state, the input information of the K preset functions of the $i^{th}$ user equipment includes at least one of the following: an International Mobile Subscriber Identity of the $i^{th}$ user equipment or a temporary logical link identifier of the $i^{th}$ user equipment; or if the $i^{th}$ user equipment is in an air-interface connected state, the input information of the K preset functions of the $i^{th}$ user equipment includes at least a connected-state identifier of the $i^{th}$ user equipment.

With reference to any one of the third aspect or the foregoing possible implementations of the third aspect, in an eighth possible implementation of the third aspect, the determining unit is further configured to determine a value of K and a value of M; and the sending unit is further configured to send the value of K and the value of M to the at least one user equipment.

With reference to any one of the third aspect or the foregoing possible implementations of the third aspect, in a ninth possible implementation of the third aspect, the sending unit is specifically configured to send the indication field to the user equipment on a broadcast channel PBCH and/or a physical downlink control channel PDCCH.

According to a fourth aspect, an embodiment of the present invention provides user equipment, where the user equipment includes: a receiving unit, configured to receive an indication field that has a length of M bits and that is sent by a base station; and a determining unit, configured to determine locations of K bits corresponding to the user equipment in the M bits, where M is a positive integer greater than 1, and K is a positive integer greater than 1 and less than M, where the determining unit is further configured to determine, according to values of the K bits, whether the user equipment receives and reads downlink information sent by the base station within a first time period.

With reference to the fourth aspect, in a first possible implementation of the fourth aspect, the determining unit is specifically configured to: determine input information of K preset functions; generate, according to the input information of the K preset functions and the K preset functions, K numbers corresponding to the user equipment, where the K numbers are used to indicate the locations of the K bits corresponding to the user equipment in the M bits; and determine the K bit locations corresponding to the K numbers in the M bits.

With reference to the first possible implementation of the fourth aspect, in a second possible implementation of the fourth aspect, the K preset functions are K preset random functions, and the K numbers are K random numbers; or the K preset functions are K preset hash functions.

With reference to any one of the fourth aspect or the foregoing possible implementations of the fourth aspect, in a third possible implementation of the fourth aspect, the determining unit is specifically configured to: determine whether all the values of the K bits are acknowledged; and if determining that all the values of the K bits are acknowledged, determine that the user equipment receives and reads the downlink information sent by the base station within the first time period; or if determining that at least one of the values of the K bits is unacknowledged, determine that the user equipment does not receive or read the downlink information sent by the base station within the first time period.

With reference to any one of the first possible implementation of the fourth aspect to the third possible implementation of the fourth aspect, in a fourth possible implementation of the fourth aspect, a type of the downlink information is any one of the following: paging signaling, a random access response used to respond to an uplink random access request, signaling used to schedule user equipment to receive downlink data, or signaling used to instruct user equipment to send uplink data.

With reference to the fourth possible implementation of the fourth aspect, in a fifth possible implementation of the fourth aspect, if the downlink information is the paging signaling, the input information of the K preset functions includes at least one of the following: an identifier of the user equipment or system time information.

With reference to the fourth possible implementation of the fourth aspect, in a sixth possible implementation of the fourth aspect, if the downlink information is the random access response used to respond to an uplink random access request, the input information of the K preset functions includes at least one of the following: identifier information in the random access request, or system time information.

With reference to the fourth possible implementation of the fourth aspect, in a seventh possible implementation of the fourth aspect, if the downlink information is the signaling used to schedule user equipment to receive downlink data or is the signaling used to instruct user equipment to send uplink data, the input information of the K preset functions includes at least one of the following: an identifier of the user equipment or system time information.

With reference to any one of the first possible implementation of the fourth aspect to the third possible implementation of the fourth aspect, in an eighth possible implementation of the fourth aspect, when the user equipment is in an air-interface idle state, the input information of the K preset functions includes at least one of the following: an International Mobile Subscriber Identity of the user equipment or a temporary logical link identifier of the user equipment; or when the user equipment is in an air-interface connected state, input of the K preset functions is a connected-state identifier of the user equipment.

With reference to any one of the foregoing possible implementations of the fourth aspect, in a ninth possible implementation of the fourth aspect, the receiving unit is further configured to receive a value of K and a value of M that are sent by the base station.

In the foregoing technical solutions, a base station may indicate, to each user equipment by using an indication field, whether the base station sends downlink information to the user equipment within a first time period. When the user equipment responds that the user equipment receives the indication field from the base station, if the user equipment determines that the user equipment does not need to receive or read the downlink information within the first time period, the user equipment may not monitor or receive a corresponding channel. In this way, user equipment power consumption can be reduced to save power.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
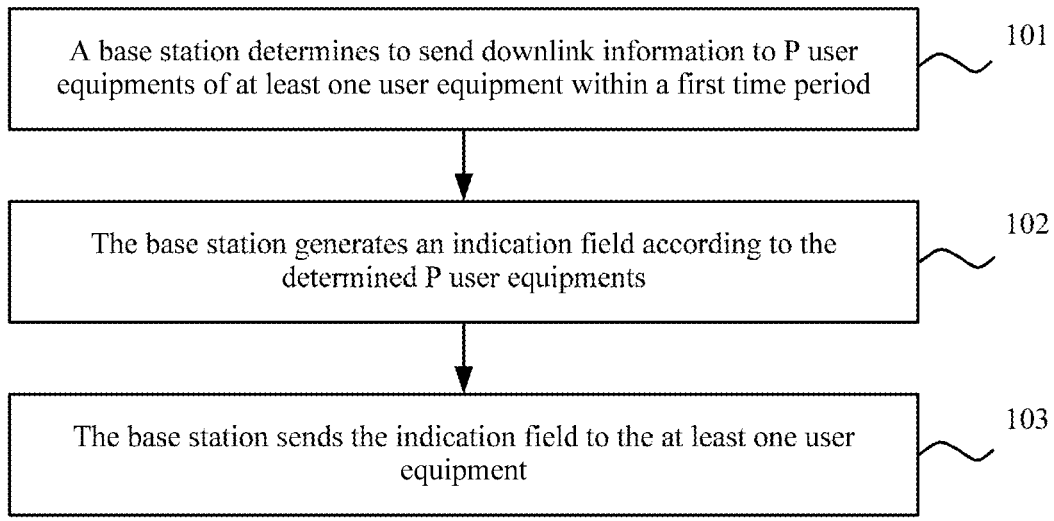
FIG. 1 is a schematic flowchart of an information transmission method according to an embodiment of the present invention.

FIG. 1 is a schematic flowchart of an information transmission method according to an embodiment of the present invention. The method shown in FIG. 1 is executed by a base station.

101. The base station determines to send downlink information to P user equipments of at least one user equipment within a first time period.

102. The base station generates an indication field according to the determined P user equipments, where the indication field includes M bits, each of the at least one user equipment is corresponding to K bits of the M bits, the K bits are used to indicate whether the corresponding user equipment needs to receive and read the downlink information sent by the base station within the first time period, M is a positive integer greater than 1, K is a positive integer greater than 1 and less than M, and P is an integer greater than or equal to 0.

103. The base station sends the indication field to the at least one user equipment.

According to the method shown in FIG. 1, a base station may indicate, to each user equipment by using an indication field, whether the base station sends downlink information to the user equipment within a first time period. When the user equipment responds that the user equipment receives the indication field from the base station, if the user equipment determines that the user equipment does not need to receive or read the downlink information within the first time period, the user equipment may not monitor or receive a corresponding channel. In this way, user equipment power consumption can be reduced to save power.

Specifically, the at least one user equipment may include user equipment of a first type and/or user equipment of a second type. The P user equipments of the at least one user equipment may be referred to as the user equipment of the first type. The user equipment of the first type is a type of user equipment that is of the at least one user equipment and to which the base station determines to send the downlink information within the first time period. For example, assuming that the downlink information that needs to be sent within the first time period is a paging message, the base station may determine, according to signaling of a core network, user equipments that need to be paged within the first time period, so as to determine that the user equipments are the user equipment of the first type. For another example, assuming that the downlink information that needs to be sent is common scheduling information of uplink data or downlink data, and the first time period is a scheduling cycle, the base station determines, according to a scheduling algorithm, user equipments scheduled within the first time period, and uses the user equipments as the user equipment of the first type. For still another example, assuming that the first time period is a time period after an uplink random access resource, and the downlink information that needs to be sent is a random access response packet used to respond to a random access request packet sent by user equipment, the base station selects, for access according to uplink resource availability, user equipments corresponding to several random access request packets, and feeds random access response packets back to the user equipments within the first time period, and the base station determines that the user equipments are the user equipment of the first type. The user equipment of the second type is user equipment to which the base station does not send the downlink information within the first time period.

Specifically, for connected-state user equipment, the base station that executes the method shown in FIG. 1 is a serving base station of the connected-state user equipment. For idle-state user equipment, the base station that executes the method shown in FIG. 1 is a base station of a cell that the idle-state user equipment camps on.

All values of the M bits are unacknowledged in an initial state of the indication field. The base station may set, to be acknowledged according to the P user equipments, all K bit locations corresponding to each of the P user equipments.

Optionally, in an embodiment, K bit locations corresponding to each of the at least one user equipment are preconfigured by the base station, and the base station sends a configuration result to the corresponding user equipment.

Optionally, in an embodiment, if P is an integer greater than 0, that the base station generates the indication field according to the determined P user equipments includes: determining, by the base station, input information of K preset functions of $i^{th}$ user equipment of the P user equipments, where i=1, . . . , P; generating, by the base station according to the input information of the K preset functions of the $i^{th}$ user equipment and the K preset functions of the $i^{th}$ user equipment, K numbers corresponding to the $i^{th}$ user equipment, where the K numbers are used to indicate locations of K bits corresponding to the $i^{th}$ user equipment in the M bits; and setting, the bit locations corresponding to the K numbers in the M bits to be acknowledged, so as to indicate that the $i^{th}$ user equipment needs to receive the downlink information sent by the base station within the first time period. All initial values of the M bits are unacknowledged. In the foregoing solution, all values of K bits corresponding to the P user equipments (that is, the user equipment of the first type) are set to be acknowledged, and no operation is performed on K bit locations corresponding to remaining user equipments (that is, the user equipment of the second type). Therefore, all values of K bits corresponding to user equipment may be set to be acknowledged, so as to indicate that the base station sends the downlink information to the user equipment within the first time period, and at least one of values of K bits corresponding to user equipment may be set to be unacknowledged, so as to indicate that the base station does not send the downlink information to the user equipment within the first time period.

It may be understood that if P is 0, the base station does not send the downlink information to any user equipment within the first time period. Therefore, the base station determines that all the M bits are unacknowledged.

A person skilled in the art may understand that it may be prespecified by both the base station and the user equipment that "1" is used to represent "acknowledged" and "0" is used to represent "unacknowledged". Certainly, alternatively, it may be prespecified by both the base station and the user equipment that "0" is used to represent "acknowledged" and "1" is used to represent "unacknowledged". Alternatively, it may be prespecified by both the base station and the user equipment that a set of code is used to represent "acknowledged" and another set of code is used to represent "unacknowledged". This is not limited in the present invention.

Optionally, in an embodiment, the K preset functions are K preset random functions, and the K numbers are K random numbers. In this case, because the preset functions are random functions, the generated numbers are random numbers. Therefore, corresponding random numbers can be generated for different user equipments, so that a false alarm probability can be reduced.

Optionally, in another embodiment, the K preset functions are K preset hash functions.

Optionally, in another embodiment, the K preset functions are K hash functions or the K hash functions modulo M.

Optionally, in another embodiment, the K preset functions are functions in which input of each preset function is equiprobably mapped to M output values.

Optionally, a type of the downlink information is any one of the following: paging signaling, a random access response used to respond to an uplink random access request, signaling used to schedule user equipment to receive downlink data, or signaling used to instruct user equipment to send uplink data.

Optionally, in an embodiment, the input information of the K preset functions of the $i^{th}$ user equipment may be corresponding to the type of the downlink information. That is, the base station may determine the input information of the K preset functions of the $i^{th}$ user equipment according to the type of the downlink information.

Specifically, if the downlink information is the paging signaling, the input information of the K preset functions of the $i^{th}$ user equipment includes at least one of the following: an identifier of the user equipment corresponding to the paging signaling, or system time information. The system time information includes any one or more of the following: a system superframe number, a system frame number, or a system subframe number.

Specifically, if the downlink information is the random access response used to respond to an uplink random access request, the input information of the K preset functions of the $i^{th}$ user equipment includes at least one of the following: identifier information in the random access request, or system time information. The system time information includes any one or more of the following: a system superframe number, a system frame number, or a system subframe number. Optionally, the identifier information in the random access request is a random number included in the random access request, or is an index value corresponding to an access sequence corresponding to the random access request.

Specifically, if the downlink information is the signaling used to schedule user equipment to receive downlink data or is the signaling used to instruct user equipment to send uplink data, the input information of the K preset functions of the $i^{th}$ user equipment includes at least one of the following: an identifier of the user equipment corresponding to the signaling, or system time information. The system time information includes any one or more of the following: a system superframe number, a system frame number, or a system subframe number.

Optionally, in another embodiment, the input information of the K preset functions of the $i^{th}$ user equipment may be corresponding to a state of the $i^{th}$ user equipment. That is, the base station may determine the input information of the K preset functions of the $i^{th}$ user equipment according to the state of the $i^{th}$ user equipment.

Specifically, if the $i^{th}$ user equipment is in an air-interface idle state, the input information of the K preset functions of the $i^{th}$ user equipment includes at least one of the following: an International Mobile Subscriber Identity (IMSI) of each user equipment of the first type, or a temporary logical link identifier of each user equipment of the first type. If the $i^{th}$ user equipment is in an air-interface connected state, the input information of the K preset functions of the $i^{th}$ user equipment includes a connected-state identifier of each user equipment of the first type. The connected-state identifier may be a cell radio network temporary identifier (C-RNTI).

Optionally, in another embodiment, the base station may determine the input information of the K preset functions of the $i^{th}$ user equipment according to a preset rule.

Specifically, that the base station determines the input information of the K preset functions of the $i^{th}$ user equipment according to the preset rule includes: prespecified user equipment identifier information (such as an IMSI or a TLLI) is used as at least one piece of input information of the preset functions according to the preset rule; further, time information may also be used as input information of some or all of the K preset functions according to the preset rule; and still further, an index number of the type of the downlink information may also be used as input information of some or all of the K preset functions according to the preset rule.

For example, a method for mapping, to the K bit locations in the M-bit indication field, the K numbers that are output from the K preset functions is described in the following example. Optionally, without loss of generality, for example, M=6 and K=2. Paging information is used as an example. It is assumed that totally two user equipments: user equipment 1 and user equipment 2 are paged within the first time period. Temporary logical link identifiers (TLLIs) corresponding to the user equipment 1 and the user equipment 2 are respectively marked as TLLI_1 and TLLI_2. In this example, the two functions that are preset between the base station and the user equipment may be defined as Hash (TLLI) and Hash(TLLI||SuperFrame number). Hash( ) represents a hash function, and TLLI||SuperFrame number represents a concatenation between a TLLI and a superframe number corresponding to the first time period. Without loss of generality, it is assumed that output of the Hash( ) function is a number (ranging from 0 to 255) with a length of 8 bits. For the user equipment 1, the base station generates two numbers each with a length of 8 bits according to two preset functions: Hash(TLLI_1) and Hash (TLLI_1||SuperFrame number). Without loss of generality, it is assumed that the two numbers are respectively 67 and 123. The base station separately performs modulo operations on M according to the preset rule, to separately obtain 1 and 3 that are output after the modulo operations, and the base station sets the first bit location and the third bit location to be acknowledged (where it is assumed that "1" represents "acknowledged"). Further, for the user equipment 2, the base station generates two numbers each with a length of 8 bits according to two preset functions: Hash(TLLI_2) and Hash(TLLI_2||SuperFrame number). Without loss of generality, it is assumed that the two numbers are respectively 254 and 57. The base station separately performs modulo operations on M according to the preset rule, to separately obtain 2 and 3 that are output after the modulo operations, and the base station sets the second bit location and the third bit location to be acknowledged (where it is assumed that "1" represents "acknowledged"). Therefore, the base station may learn, according to the TLLIs of the user equipment 1 and the user equipment 2 and the superframe number corresponding to the first time period, that the first bit location and the third bit location should be set for the user equipment 1, and the second bit location and the third bit location should be set for the user equipment 2. Therefore, in conclusion, the first bit location, the second bit location, and the third bit location in the indication field should be set, and an indication field obtained after the setting is 011100.

Further, before the generating, by the base station according to the input information of the K preset functions of the $i^{th}$ user equipment and the K preset functions of the $i^{th}$ user equipment, K numbers corresponding to the $i^{th}$ user equipment, the method further includes: determining, by the base station, values of K and M, and sending the values of K and M to the user equipment.

It may be understood that the values of K and M are related to average load within the first time period, that is, an average quantity of user equipments of the first type that need to be scheduled within the first time period and to which the downlink information needs to be sent within the first time period (where it is assumed that the average quantity is P', and P' herein is the average quantity of user equipments of the first type). When the average load is heavy, a value of M should be increased. When the average load is relatively light, a value of M may be properly reduced. When a value of K is determined, if the load is relatively heavy, it is very likely that most bit locations in the M bits are set to be acknowledged for P' user equipments. In this case, for user equipment that is not scheduled by the base station within the first time period or user equipment to which the base station does not send the downlink information within the first time period, there is a higher probability that K bit locations corresponding to the user equipment are set to be acknowledged (where there is a false alarm in this case). Therefore, when the load becomes heavier, a bit quantity (that is, the value of M) of the indication field should be properly increased. An optimal value of the value of K is actually related to the average load quantity P' and the value of M. Therefore, when the average load changes, the base station or another network device should be allowed to send an updated value of K and/or an updated value of M to all user equipments that need to read the indication field.

Further, the base station may adjust the value of K and/or the value of M as required. If a smaller quantity (where it is assumed that the quantity is P) of user equipments need to be scheduled, the value of M may be properly reduced. If a larger quantity of user equipments need to be scheduled, the value of M may be properly increased to reduce a false alarm probability. Correspondingly, for different values of M and different quantities of user equipments that need to be scheduled, the base station may obtain optimal values or better values of K. For example, the value of K may be $$\left\lfloor \frac{M}{P} \ln 2 \right\rfloor.$$

Certainly, optionally, to reduce implementation complexity, the value of K may be simply fixed at 2 or 3. The base station may send the determined value of M to all the user equipments that need to read the indication field. Optionally, the base station may send the value of K to all the user equipments that need to read the indication field. Optionally, the base station may send the value of K or the value of M to the user equipments in a broadcast manner, or the base station may directly send the value of K or the value of M to the user equipments.

Optionally, in an embodiment, if the indication field may be sent periodically or be sent based on event trigger, so as to indicate whether the user equipment receives and reads downlink information within different first time periods, the base station may keep the value of M unchanged, update only the value of K, and send an updated value of K to the user equipment; or the base station may keep the value of K unchanged, update only the value of M, and send an updated value of M to the user equipment; or the base station updates both the value of K and the value of M, and sends an updated value of K and an updated value of M to the user equipment.

Optionally, the value of K and the value of M may be preset between the base station and the user equipment. That is, optionally, a suitable value of K and a suitable value of M may be determined according to a long-term average service model of the system. Optionally, limited physical layer resources that carry the indication field may further need to be considered to determine the value of M, so as to select a suitable value of M, and then further select a suitable corresponding value of K. Optionally, after being selected, the values of K and M do not need to be changed, and the base station and the user equipment can perform calculation based on the preset value of K and the preset value of M. Optionally, if the value of K and the value of M may be half-statically changed, a same value of K and a same value of M may be set between the base station and the user equipment by using higher signaling.

Further, the base station sends the indication field to the user equipment on a Physical Broadcast Channel (PBCH) and/or a physical downlink control channel. Specifically, the indication field may be broadcast by using the broadcast channel, or may be periodically sent on the PDCCH by using a common downlink control information (common DCI) or a common PDCCH message.

Figure 2:
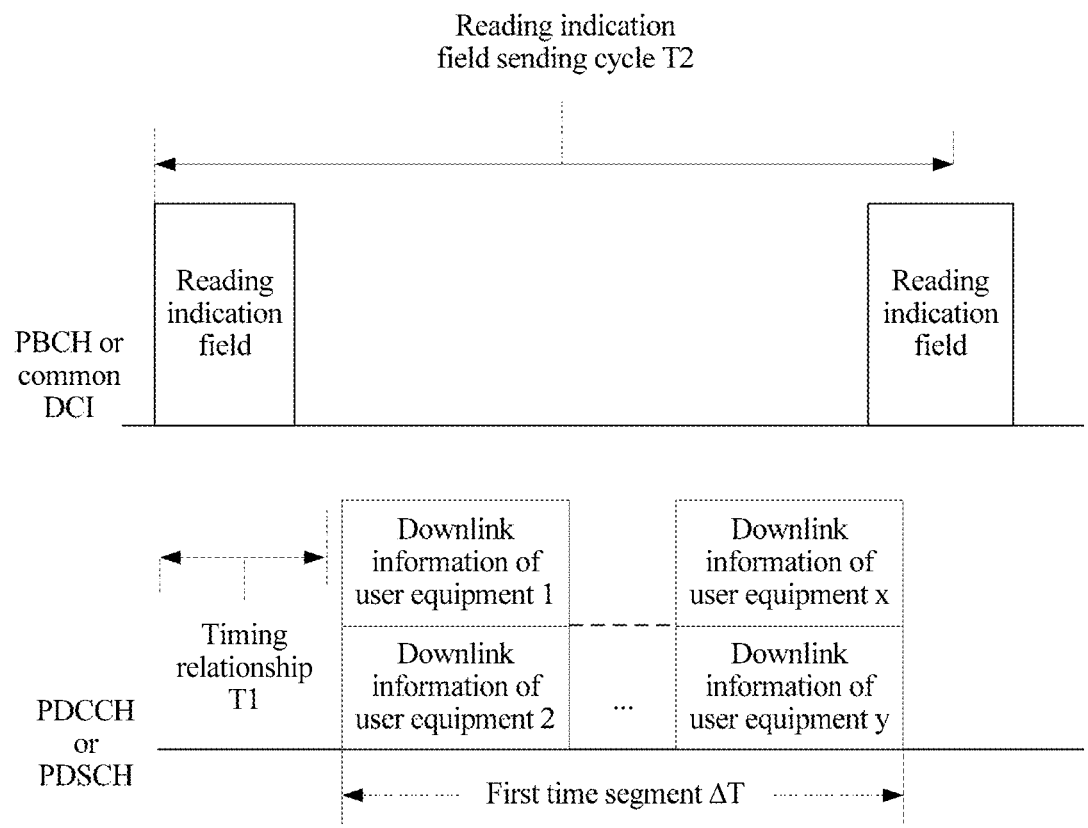
FIG. 2 is a schematic diagram of a timing relationship.

Further, there should be a clear definition of a timing relationship between the indication field and the first time period. The definition of the timing relationship is preconfigured by the base station for the user equipment, or the timing relationship is a preset timing relationship. FIG. 2 is a schematic diagram of a timing relationship. As shown in FIG. 2, if the indication field is used to indicate whether the user equipment needs to receive and read the downlink information within the first time period, the indication field should start to be sent at a preset time prior to a start time of the first time period. Assuming that a time deviation between the indication field and the corresponding first time period is a timing relationship T1, the timing relationship T1 is greater than a time for receiving and processing the indication field obtained by the user equipment.

According to a specified timing relationship T1 and a specified length ΔT of the first time period that are the same as those of the base station, the user equipment should obtain the indication field and determine whether to receive and read the downlink information within the first time period. Therefore, the base station and the user equipment reach an agreement on the timing relationship T1 and the length ΔT of the first time period in advance; or the base station configures the timing relationship T1 and the length ΔT of the first time period for the user equipment by using signaling; or the timing relationship T1 and the length ΔT of the first time period are predefined values.

The base station sends, according to the timing relationship T1 and the length ΔT of the first time period, the corresponding indication field and the downlink information for the user equipment within the corresponding first time period. The user equipment determines, according to the predefined/preconfigured timing relationship T1 and length ΔT of the first time period, the start time and the length of the first time period indicated by using the read indication field.

Optionally, if the indication field is periodically sent, an indication field sending cycle T2 may further need to be preset between the base station and the user equipment. The indication field sending cycle may also be preset between the base station and the user equipment in a preconfigured or predefined manner.

Figure 3:
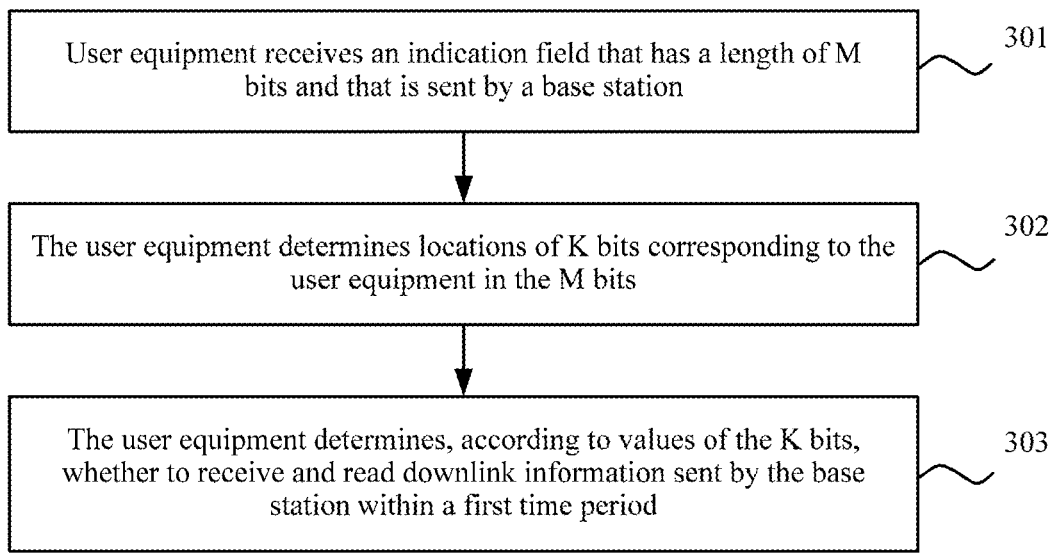
FIG. 3 is a schematic flowchart of an information transmission method according to an embodiment of the present invention.

FIG. 3 is a schematic flowchart of an information transmission method according to an embodiment of the present invention.

301. User equipment receives an indication field that has a length of M bits and that is sent by a base station.

302. The user equipment determines locations of K bits corresponding to the user equipment in the M bits.

303. The user equipment determines, according to values of the K bits, whether to receive and read downlink information sent by the base station within a first time period.

According to the method shown in FIG. 3, the user equipment may determine, according to the indication field, whether the user equipment needs to receive and read the downlink information sent by the base station within the first time period. If determining that the user equipment needs to receive and read the downlink information sent by the base station, the user equipment monitors a corresponding channel within the first time period. If determining that the user equipment does not need to receive or read the downlink information sent by the base station, the user equipment may not monitor a corresponding channel within the first time period. In addition, multiple bit locations are used to indicate whether one user equipment needs to receive and read scheduling control information and a corresponding data channel within the first time period, so that an unnecessary false alarm can be reduced. If the user equipment is connected-state user equipment, the base station is a serving base station of the user equipment. If the user equipment is idle-state user equipment, the base station is a base station in which a cell that the user equipment camps on is located.

Optionally, in an embodiment, the determining locations of K bits corresponding to the user equipment in the M bits includes: receiving bit location indication information preconfigured by the base station, where the bit location indication information includes the K bit locations corresponding to the user equipment; and determining, according to the bit location indication information, the K bit locations corresponding to the user equipment.

Optionally, in another embodiment, that the user equipment determines locations of K bits corresponding to the user equipment in the M bits includes: determining, by the user equipment, input information of K preset functions; generating, by the user equipment according to the input information of the K preset functions and the K preset functions, K numbers corresponding to the user equipment, where the K numbers are used to indicate the locations of the K bits corresponding to the user equipment in the M bits; and determining, by the user equipment, the K bit locations corresponding to the K numbers in the M bits. For example, idle-state user equipment in an S1-based architecture or user equipment whose ready timer encounters timeout in a Gb-based architecture periodically receives, on a paging occasion, a paging request message that may arrive. Therefore, if the first time period includes a paging occasion of idle-state user equipment, downlink information that the user equipment expects to receive within the first time period is a paging request message. For example, downlink information that user equipment that is in a connected state within the first time period expects to receive within the first time period is signaling for scheduling the user equipment to receive downlink data and signaling for instructing the user equipment to send uplink data. After sending a random access request message, user equipment that wants to access the base station by using a random access procedure (RACH Procedure) needs to wait for the base station to feed a random access response message back, and performs subsequent uplink sending and downlink receiving according to the response message. Therefore, downlink information that user equipment sending a random access request expects to receive within the first time period is a random access response message.

Optionally, in an embodiment, the K preset functions are K preset random functions, and the K numbers are K random numbers. In this case, because the preset functions are random functions, the generated numbers are random numbers. Therefore, corresponding random numbers can be generated for different user equipments, so that a false alarm probability can be reduced.

Optionally, in another embodiment, the K preset functions are K preset hash functions.

Optionally, in another embodiment, the K preset functions are K hash functions or the K hash functions modulo M.

Optionally, in another embodiment, the K preset functions are functions in which input of each preset function is equiprobably mapped to M output values.

Specifically, that the user equipment determines, according to values of the K bits, whether to receive and read downlink information sent by the base station within a first time period includes: if determining that all the values of the K bits are acknowledged, determining, by the user equipment, to receive and read the downlink information sent by the base station within the first time period; or if determining that at least one of the values of the K bits is unacknowledged, determining, by the user equipment, not to receive or read the downlink information sent by the base station within the first time period.

It may be understood that the user equipment shown in FIG. 3 is user equipment to which the base station may send the downlink information within the first time period. Paging is used as an example. If the first time period includes a paging occasion of idle-state user equipment, the base station may send a paging request message to the user equipment on the paging occasion according to a paging sending rule. Therefore, the user equipment should obtain the indication field corresponding to the first time period, so as to determine whether the user equipment needs to read the downlink information within the first time period. Further, these user equipments may be classified into three types: user equipment of a first type, user equipment of a second type, and user equipment of a third type.

The user equipment of the first type is the P user equipments in the method shown in FIG. 1. Because the base station determines to send the downlink information to the user equipment of the first type within the first time period, values of K bits that are in the indication field corresponding to the first time period and that are corresponding to each user equipment of the first type are certainly acknowledged. Therefore, the user equipment of the first type certainly further receives and reads the downlink information within the first time period. Therefore, it may be learned that in the method in the present invention, any user equipment of the first type does not miss the downlink information sent within the first time period.

The user equipment of the second type is user equipment to which the base station does not send the downlink information within the first time period, and at least one of values of K bits in the indication field that are corresponding to each user equipment of the second type is unacknowledged. Therefore, after obtaining the indication field, the user equipment of the second type can determine not to receive or read the downlink information sent by the base station within the first time period, so as to reduce power consumption.

The user equipment of the third type is user equipment to which the base station does not send the downlink information within the first time period, and all values of K bits in the indication field that are corresponding to the user equipment of the third type are acknowledged. Therefore, after reading the indication field, the user equipment of the third type receives and reads the downlink information sent by the base station within the first time period. However, because the base station actually does not send the downlink information to the user equipment of the third type, in a process of reading the downlink information sent by the base station, the user equipment of the third type cannot find downlink information corresponding to the user equipment of the third type (downlink information that matches an identifier of the user equipment of the third type), and stops reading subsequent information. For example, after connected-state user equipment of the third type obtains the indication field, because all K bit locations are set, the user equipment continues reading scheduling information in a PDCCH. However, because the base station actually does not schedule the user equipment, the user equipment cannot find corresponding scheduling information in the PDCCH, and the user equipment does not further continue reading a PDSCH or sending a PUSCH. Actually, the user equipment of the third type occurs because K bit locations of the user equipment of the third type exactly overlap bit locations that are set for all user equipments of the first type within the first time period. This belongs to a false alarm case. However, in a subsequent downlink information reading process, because the device of the third type learns that the base station does not send the downlink information to the device of the third type, the device of the third type only cannot use relatively low power consumption to read downlink signaling like the device of the second type, but does not cause another result. In the method in the present invention, when values of K and of M are suitable, a proportion of the user equipment of the third type may be controlled to be relatively low, and lower than a preset threshold.

Optionally, a type of the downlink information is any one of the following: paging signaling, a random access response used to respond to an uplink random access request, signaling used to schedule user equipment to receive downlink data, or signaling used to instruct user equipment to send uplink data.

Optionally, in an embodiment, the input information of the K preset functions may be corresponding to the type of the downlink information. That is, the determining, by the user equipment, input information of K preset functions includes: determining, by the user equipment, the input information of the K preset functions according to the type of the downlink information.

Specifically, if the downlink information is the paging signaling, the input information of the K preset functions of the $i^{th}$ user equipment includes at least one of the following: an identifier of the user equipment corresponding to the paging signaling, or system time information. The system time information includes any one or more of the following: a system superframe number, a system frame number, or a system subframe number. All user equipments may have different identifiers, so that a relatively low probability of outputting same K numbers based on K preset functions can be ensured. In particular, for some functions (such as a hash function), if input is different, there is a quite high probability that output is different. Therefore, the relatively low probability of outputting same K numbers for different user equipments can be further ensured, and then a false alarm is avoided.

Specifically, if the downlink information is the random access response used to respond to an uplink random access request, the input information of the K preset functions of the $i^{th}$ user equipment includes at least one of the following: identifier information in the random access request, or system time information. The system time information includes any one or more of the following: a system superframe number, a system frame number, or a system subframe number. Optionally, the identifier information in the random access request is a random number included in the random access request, or is an index value corresponding to an access sequence corresponding to the random access request. According to an agreement between the base station and the user equipment, the identifier information in the random access request is the random number included in the random access request, or is the index value corresponding to the access sequence corresponding to the random access request. Random access requests of all user equipments of the first type may have different identifier information, so that there is a relatively low probability of outputting same K numbers based on K preset functions. In particular, for some functions (such as a hash function), if input is different, there is a quite high probability that output is different. Therefore, the relatively low probability of outputting same K numbers for different user equipments can be further ensured, and then a false alarm is avoided.

Specifically, if the downlink information is the signaling used to schedule user equipment to receive downlink data or is the signaling used to instruct user equipment to send uplink data, the input information of the K preset functions of the $i^{th}$ user equipment includes at least one of the following: an identifier of the user equipment corresponding to the signaling, or system time information. The system time information includes any one or more of the following: a system superframe number, a system frame number, or a system subframe number. All user equipments of the first type have different identifiers, so that there is a relatively low probability of outputting same K numbers based on K preset functions. In particular, for some functions (such as a hash function), if input is different, there is a quite high probability that output is different. Therefore, the relatively low probability of outputting same K numbers for different user equipments can be further ensured, and then a false alarm is avoided.

Optionally, in another embodiment, the input information of the K preset functions is corresponding to a state of the user equipment. That is, that the user equipment determines the input information of the K preset functions includes: determining, by the user equipment, the input information of the K preset functions according to the state of the user equipment.

Specifically, when the user equipment is in an air-interface idle state, the input information of the K preset functions includes at least one of the following: an International Mobile Subscriber Identity of the user equipment or a temporary logical link identifier of the user equipment. When the user equipment is in an air-interface connected state, the input information of the K preset functions is a connected-state identifier of the user equipment.

Optionally, in another embodiment, that the user equipment determines the input information of the K preset functions includes: determining, by the user equipment, the input information of the K preset functions according to a preset rule.

Further, before the generating, according to the input information of the K preset functions and the K preset functions, K numbers corresponding to the user equipment, the method further includes: receiving, by the user equipment, a value of K and a value of M that are sent by the base station.

Optionally, in an embodiment, if the indication field may be sent periodically or be sent based on event trigger, so as to indicate whether the user equipment receives and reads downlink information within different first time periods, the base station may keep the value of M unchanged, update only the value of K, and send an updated value of K to the user equipment; or the base station may keep the value of K unchanged, update only the value of M, and send an updated value of M to the user equipment; or the base station updates both the value of K and the value of M, and sends an updated value of K and an updated value of M to the user equipment. In this case, if receiving only the value of K, the user equipment determines that the value of M is the same as a value, which is received last time, of M. Similarly, if receiving only the value of M, the user equipment determines that the value of K is the same as a value, which is received last time, of K.

To help a person skilled in the art better understand the present invention, the following describes the present invention with reference to a specific embodiment. It may be understood that the specific embodiment is merely intended to help understand the present invention, but is not intended to limit the present invention.

Without loss of generality, herein, for example, M=6 and K=2. In addition, paging is used as an example for description. The base station determines that the base station needs to send paging signaling to each of user equipment 1 and user equipment 2 at a paging moment in the first time period. Assuming that random numbers of each user equipment are determined by using two random functions, the base station may use one or more of an identifier of the user equipment, a system superframe number, a system frame number, or a system subframe number as input of the random functions. The identifier of the user equipment may be any one or more of a temporary logical link identifier (TLLI), an international mobile subscriber identity (IMSI), or a System Architecture Evolution (SAE) temporary mobile subscriber identity (S-TMSI) of the user equipment. For example, the base station may use an identifier of the user equipment 1 as input of a random function 1 of the user equipment 1, so as to obtain a random number 1 of the user equipment 1; and the base station may further use the identifier of the user equipment 1 as input of a random function 2 of the user equipment 1, so as to obtain a random number 2 of the user equipment 1. For another example, the base station may use an IMSI of the user equipment 1 as input of a random function 1 of the user equipment 1, so as to obtain a random number 1 of the user equipment 1; and the base station may further use a TLLI of the user equipment 1 as input of a random function 2 of the user equipment 1, so as to obtain a random number 2 of the user equipment 1. Similarly, the base station may further obtain, by using random functions of the user equipment 2, a random number 1 and a random number 2 that are corresponding to the user equipment 2. Both the random functions and input parameters of the random functions are prespecified, and in this case, the base station and the user equipment obtain corresponding random numbers by means of mapping by using a same rule. After separately determining the random numbers of the user equipment 1 and the user equipment 2, the base station may determine two bit locations that are in the indication field with the length of M bits and that are corresponding to the two random numbers of each user equipment. It is assumed that the value of M is 6, the random number 1 of the user equipment 1 is corresponding to the first bit location, the random number 2 of the user equipment 1 is corresponding to the third bit location, the random number 1 of the user equipment 2 is corresponding to the second bit location, and the random number 2 of the user equipment 2 is corresponding to the third bit location. In this case, values of the first bit, the second bit, and the third bit of the M bits may be set to be acknowledged. It may be understood that the M bits in the indication field are unacknowledged in an initial state. For example, if "0" is used to represent "unacknowledged", and "1" is used to represent "acknowledged", all values of the $0^{th}$ bit to the fifth bit are 0 in an initial state of the indication field, that is, 000000. In this example, the first bit, the second bit, and the third bit may be set to 1, that is, the state of the indication field is changed to 011100. After setting the indication field, the base station sends, to the user equipments, an indication field obtained after the setting.

For example, a specific method for mapping, to the K bit locations in the M-bit indication field, the K numbers that are output from the K preset functions is described in the following. It is assumed that user equipment 1 and user equipment 2 are paged, and TLLI numbers corresponding to the user equipment 1 and the user equipment 2 are respectively marked as TLLI_1 and TLLI_2. In this example, the two functions that are preset between the base station and the user equipment may be defined as Hash(TLLI) and Hash (TLLI||SuperFrame number). Hash( ) represents a hash function, and TLLI||SuperFrame number represents a concatenation between a TLLI and a superframe number corresponding to the first time period. Without loss of generality, it is assumed that output of the Hash( ) function is a number (ranging from 0 to 255) with a length of 8 bits. For the user equipment 1, the base station generates two numbers each with a length of 8 bits according to two preset functions: Hash(TLLI_1) and Hash(TLLI_1||SuperFrame number). Without loss of generality, it is assumed that the two numbers are respectively 67 and 123. The base station separately performs modulo operations on M according to the preset rule, to separately obtain 1 and 3 that are output after the modulo operations, and the base station sets the first bit location and the third bit location to be acknowledged (where it is assumed that "1" represents "acknowledged"). Further, for the user equipment 2, the base station generates two numbers each with a length of 8 bits according to two preset functions: Hash(TLLI_2) and Hash (TLLI_2||SuperFrame number). Without loss of generality, it is assumed that the two numbers are respectively 254 and 57. The base station separately performs modulo operations on M according to the preset rule, to separately obtain 2 and 3 that are output after the modulo operations, and the base station sets the second bit location and the third bit location to be acknowledged (where it is assumed that "1" represents "acknowledged"). Therefore, the base station may learn, according to the TLLIs of the user equipment 1 and the user equipment 2 and the superframe number corresponding to the first time period, that the first bit location and the third bit location should be set for the user equipment 1, and the second bit location and the third bit location should be set for the user equipment 2. Therefore, in conclusion, the first bit location, the second bit location, and the third bit location in the indication field should be set, and an indication field obtained after the setting is 011100.

Figure 4:
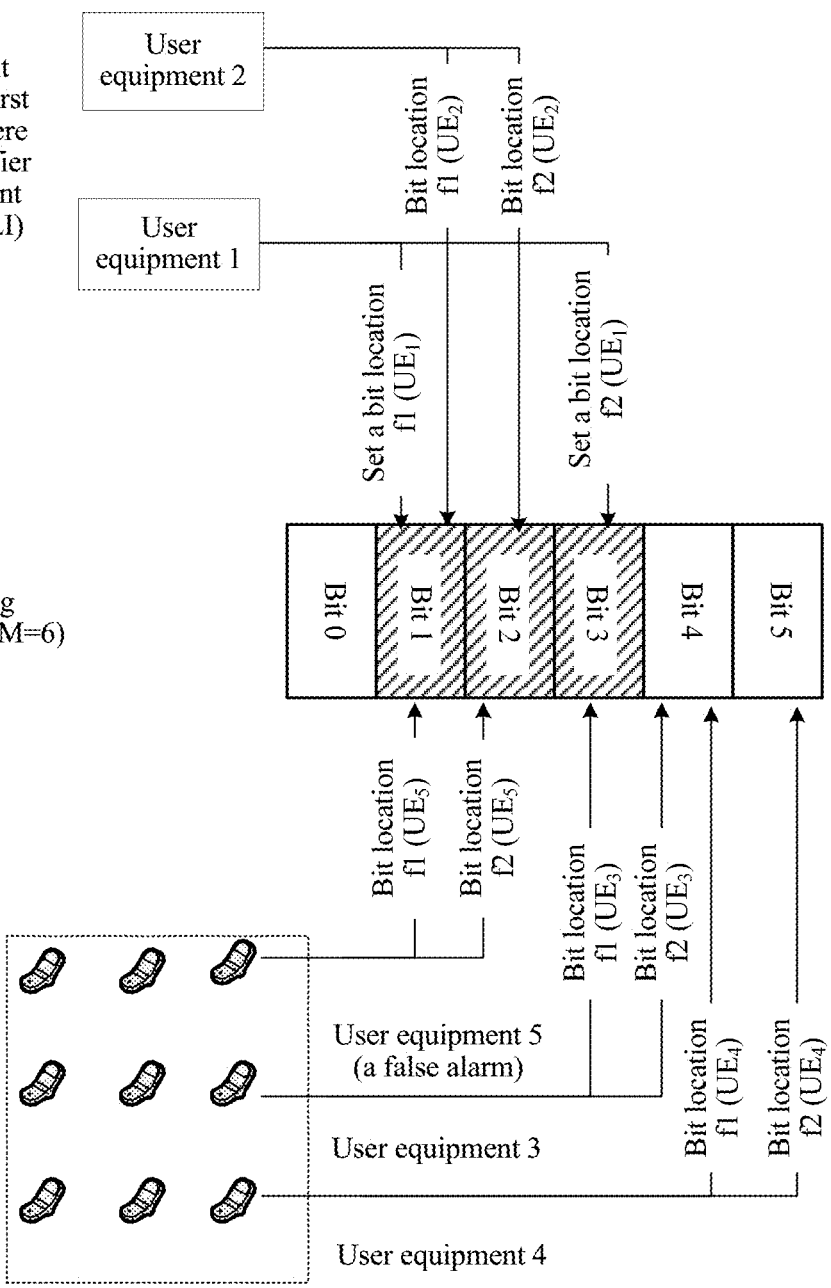
FIG. 4 is a schematic diagram of an information transmission method according to an embodiment of the present invention.

FIG. 4 is a schematic diagram of an information transmission method according to an embodiment of the present invention. Paging signaling is used as an example in the method shown in FIG. 4. After receiving an indication field, user equipment may determine K random numbers by using K preset random functions, determine K bit locations in the indication field that are corresponding to the K random numbers, and determine, according to values of K bits, whether the user equipment is scheduled on a paging occasion in the first time period. It may be understood that the random functions and input of the random functions that are used by the user equipment are the same as random functions and input of the random functions that are used by a base station. In this case, user equipment 1 may determine that a bit location corresponding to a random number 1 is the first bit location, and a bit location corresponding to a random number 2 is the third bit location. User equipment 2 may determine that a bit location corresponding to a random number 1 is the second bit location, and a bit location corresponding to a random number 2 is the third bit location. In addition, if the user equipment 1 learns, by reading the first bit location and the third bit location in the indication field, that the two bit locations are set to be acknowledged, the user equipment 1 may determine that the user equipment 1 may be scheduled on a corresponding paging occasion, and may determine that the user equipment 1 needs to further read scheduling information on the paging occasion in the corresponding first time period, so as to read a corresponding paging request message. If the user equipment 2 learns, by reading the second bit location and the third bit location in the indication field, that the two bit locations are set to be acknowledged, the user equipment 2 may determine that the user equipment 2 may be scheduled on a paging occasion in the first time period, and may determine that the user equipment 2 needs to further read scheduling information on the paging occasion in the corresponding first time period, so as to match and read a corresponding paging request message. It is assumed that user equipment 3, user equipment 4, and user equipment 5 in N user equipments also receive and read indication information within the first time period. If the user equipment 3 determines that a bit location corresponding to a random number 1 is the third bit location, and a bit location corresponding to a random number 2 is the fourth bit location, the user equipment 3 finds, by reading the indication field, that the third bit location is acknowledged, and the fourth bit location is unacknowledged. In this case, the user equipment 3 determines that the user equipment 3 is not scheduled on any paging occasion in the corresponding first time period. Similarly, assuming that the user equipment 4 determines that a bit location corresponding to a random number 1 is the fourth bit location, and a bit location corresponding to a random number 2 is the fifth bit location, the user equipment 4 finds, by reading the indication field, that both the fourth bit location and the fifth bit location in the indication field are unacknowledged. In this case, the user equipment 4 may determine that the user equipment 4 is not scheduled on any paging occasion in the first time period. Assuming that the user equipment 5 determines that a bit location corresponding to a random number 1 is the first bit location, and a bit location corresponding to a random number 2 is the second bit location, the user equipment 5 finds, by reading the indication field, that both the first bit location and the second bit location in the indication field are acknowledged. In this case, the user equipment 5 considers that the user equipment 5 may be scheduled on a paging occasion in the first time period, and may determine that the user equipment 5 needs to further read scheduling information on the paging occasion in the corresponding first time period, so as to determine whether the user equipment 5 is paged. When determining that the user equipment 1 and the user equipment 2 may be scheduled on the paging occasions in the first time period, the user equipment 1 and the user equipment 2 may read a physical downlink control channel (PDCCH) or an optional physical downlink shared channel (PDSCH) in the first time period, so as to determine whether the user equipment 1 and the user equipment 2 are paged. The user equipment 3 and the user equipment 4 may determine that the user equipment 3 and the user equipment 4 are certainly not paged on any paging occasion in the first time period. Therefore, receivers can be disabled for the user equipment 3 and the user equipment 4, so that the user equipment 3 and the user equipment 4 continue entering a sleep mode, and do not read any PDCCH or PDSCH. The user equipment 5 is actually not paged within the first time period (according to an assumption that only the user equipment 1 and the user equipment 2 are paged within the first time period). However, because the two bit locations (the first bit location and the second bit location) corresponding to the user equipment 5 exactly overlap bit locations of the user equipment 1 and the user equipment 2, this belongs to a false alarm case. In this case, the user equipment 5 considers that the user equipment 5 may be paged within the first time period, so as to check a PDCCH in the first time period. After checking all possible PDCCHs, the user equipment 5 finds that the user equipment 5 is not paged. In this example, the user equipment 1 and the user equipment 2 belong to user equipment of a first type, the user equipment 3 and the user equipment 4 belong to user equipment of a second type, and the user equipment 5 belongs to user equipment of a third type.

Further, for example, a specific method for mapping, to the K bit locations in the M-bit indication field, the K numbers that are output from the K (for example, K=2) preset functions is described in the following. According to the foregoing example, the indication field is 011100. TLLI numbers corresponding to the user equipment 1 and the user equipment 2 in the user equipment of the first type are respectively marked as TLLI_1 and TLLI_2. In this example, the two functions that are preset between the base station and the user equipment may be defined as Hash (TLLI) and Hash(TLLI||SuperFrame number). Hash( ) represents a hash function, and TLLI||SuperFrame number represents a concatenation between a TLLI and a superframe number corresponding to the first time period. Without loss of generality, it is assumed that output of the Hash( ) function is a number (ranging from 0 to 255) with a length of 8 bits. The user equipment 1 generates two numbers each with a length of 8 bits according to two preset functions: Hash(TLLI_1) and Hash(TLLI_1||SuperFrame number). Without loss of generality, it is assumed that the two numbers are respectively 67 and 123. The user equipment 1 separately performs modulo operations on M according to a preset rule, to separately obtain 1 and 3 that are output after the modulo operations. Therefore, the user equipment 1 determines, by reading the first bit location and the third bit location in the indication field, whether the user equipment 1 reads a subsequent PDCCH and PDSCH to read a paging message. If the user equipment 1 learns, by reading the first bit location and the third bit location in the indication field, that the two bit locations are set to be acknowledged, the user equipment 1 may determine that the user equipment 1 may be scheduled on a corresponding paging occasion, and may determine that the user equipment 1 needs to further read scheduling information on the paging occasion in the corresponding first time period, so as to read a corresponding paging request message. Further, the user equipment 2 generates two numbers each with a length of 8 bits according to two preset functions: Hash(TLLI_2) and Hash (TLLI_2||SuperFrame number). Without loss of generality, it is assumed that the two numbers are respectively 254 and 57. The user equipment 2 separately performs modulo operations on M according to the preset rule, to separately obtain 2 and 3 that are output after the modulo operations. Therefore, the user equipment 2 determines, by reading the second bit location and the third bit location in the indication field, whether the user equipment 2 reads a subsequent PDCCH and PDSCH to read a paging message. If the user equipment 2 learns, by reading the second bit location and the third bit location in the indication field, that the two bit locations are set to be acknowledged, the user equipment 2 may determine that the user equipment 2 may be scheduled on a corresponding paging occasion, and may determine that the user equipment 2 needs to further read scheduling information on the paging occasion in the corresponding first time period, so as to read a corresponding paging request message. TLLI numbers corresponding to the user equipment 3 and the user equipment 4 in the user equipment of the second type are respectively marked as TLLI_3 and TLLI_4. The user equipment 3 generates two numbers each with a length of 8 bits according to two preset functions: Hash(TLLI_3) and Hash(TLLI_3||SuperFrame number). Without loss of generality, it is assumed that the two numbers are respectively 21 and 100. The user equipment 3 separately performs modulo operations on M according to the preset rule, to separately obtain 3 and 4 that are output after the modulo operations. Therefore, the user equipment 3 determines, by reading the third bit location and the fourth bit location in the indication field, whether the user equipment 3 reads a subsequent PDCCH and PDSCH to read a paging message. The user equipment 3 finds, by reading the indication field, that the third bit location is acknowledged, and the fourth bit location is unacknowledged. In this case, the user equipment 3 determines that the user equipment 3 is not scheduled on any paging occasion in the corresponding first time period. Similarly, the user equipment 4 generates two numbers each with a length of 8 bits according to two preset functions: Hash(TLLI_4) and Hash(TLLI_4||SuperFrame number). Without loss of generality, it is assumed that the two numbers are respectively 244 and 59. The user equipment 4 separately performs modulo operations on M according to the preset rule, to separately obtain 4 and 5 that are output after the modulo operations. Therefore, the user equipment 4 determines, by reading the fourth bit location and the fifth bit location in the indication field, whether the user equipment 4 reads a subsequent PDCCH and PDSCH to read a paging message. The user equipment 4 finds that both the fourth bit location and the fifth bit location in the indication field are unacknowledged. In this case, the user equipment 4 may determine that the user equipment 4 is not scheduled on any paging occasion in the first time period. A TLLI number corresponding to the user equipment 5 in the user equipment of the third type is TLLI_5. The user equipment 5 generates two numbers each with a length of 8 bits according to two preset functions: Hash(TLLI_5) and Hash(TLLI_5||SuperFrame number). Without loss of generality, it is assumed that the two numbers are respectively 181 and 212. The user equipment 5 separately performs modulo operations on M according to the preset rule, to separately obtain 1 and 2 that are output after the modulo operations. The user equipment 5 is actually not paged within the first time period (according to an assumption that only the user equipment 1 and the user equipment 2 are paged within the first time period). However, because the two bit locations (the first bit location and the second bit location) corresponding to the user equipment 5 exactly overlap bit locations of the user equipment 1 and the user equipment 2, this belongs to a false alarm case. In this case, the user equipment 5 considers that the user equipment 5 may be paged within the first time period, so as to check a PDCCH in the first time period. After checking all possible PDCCHs, the user equipment 5 finds that the user equipment 5 is not paged.

Figure 5:
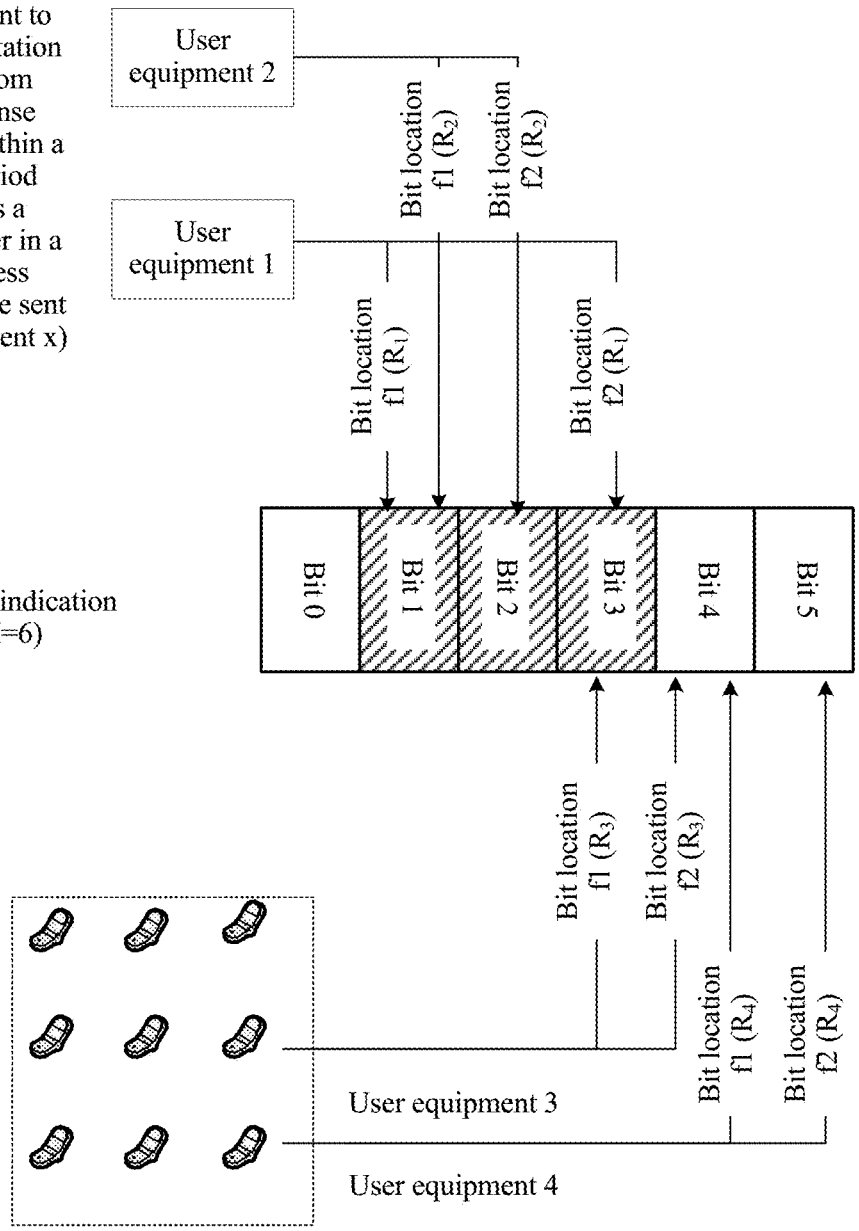
FIG. 5 is a schematic diagram of another information transmission method according to an embodiment of the present invention.

FIG. 5 is a schematic diagram of another information transmission method according to an embodiment of the present invention. User equipment sending a random access channel (RACH) message is used as an example in the method shown in FIG. 5. Assuming that the user equipment sends a random access request message to a base station on a preset RACH resource, the base station replies with a random access request response message in one or more frames after the RACH resource. Otherwise, the user equipment considers that no response is made to the random access request message of the user equipment. It is assumed that user equipment 1, user equipment 2, user equipment 3, and user equipment 4 each send a random access request message on a RACH resource. Because of limited uplink resources or the like, the base station determines that the base station can send random access response messages to the user equipment 1 and the user equipment 2 in a frame of one or more frames after the RACH resource. Assuming that without loss of generality, random numbers of each user equipment are determined by using two random functions, the base station may use, as at least one input parameter of the random functions, a random number in a random access request sent by the user equipment, so as to determine random numbers of the user equipment 1 and the user equipment 2. After separately determining the random numbers of the user equipment 1 and the user equipment 2, the base station may determine two bit locations that are in an indication field with a length of M bits and that are corresponding to the two random numbers of each user equipment. It is assumed that a value of M is 6, a random number 1 of the user equipment 1 is corresponding to the first bit location, a random number 2 of the user equipment 1 is corresponding to the third bit location, a random number 1 of the user equipment 2 is corresponding to the second bit location, and a random number 2 of the user equipment 2 is corresponding to the third bit location. In this case, values of the first bit, the second bit, and the third bit of the M bits may be set to be acknowledged. It may be understood that M bit locations in the indication field are unacknowledged in an initial state. For example, if "0" is used to represent "unacknowledged", and "1" is used to represent "acknowledged", all values of the $0^{th}$ bit to the fifth bit are 0 in an initial state of the indication field, that is, 000000. In this example, the first bit location, the second bit location, and the third bit location may be set to 1, that is, the state of the indication field is changed to 011100. After setting the indication field, the base station sends, to all user equipments that may need to read a random access response in the frame, an indication field obtained after the setting. After receiving the indication field, the user equipment may determine K random numbers by using K preset random functions, determine K bit locations in the indication field that are corresponding to the K random numbers, and determine, according to values of K bits, whether the user equipment is scheduled and a random access response packet is fed back to the user equipment in the frame that can be used to send a random access response packet. It may be understood that the random functions and input of the random functions that are used by the user equipment are the same as random functions and input of the random functions that are used by the base station. In this case, the user equipment 1 may determine that a bit location corresponding to the random number 1 is the first bit location, and a bit location corresponding to the random number 2 is the third bit location. The user equipment 2 may determine that a bit location corresponding to the random number 1 is the second bit location, and a bit location corresponding to the random number 2 is the third bit location. In addition, if the user equipment 1 learns, by reading the indication field, that both the first bit location and the third bit location are set to be acknowledged, and the user equipment 2 learns, by reading the indication field, that both the second bit location and the third bit location are set to be acknowledged, the user equipment 1 and the user equipment 2 may determine that random access response packets may be fed back to the user equipment 1 and the user equipment 2 in the frame, so as to determine that the user equipment 1 and the user equipment 2 need to read a PDCCH to determine whether random access response packets are sent to the user equipment 1 and the user equipment 2. Assuming that the user equipment 3 determines that a bit location corresponding to a random number 1 is the third bit location, and a bit location corresponding to a random number 2 is the fourth bit location, the user equipment 3 finds, by reading the indication field, that the third bit location is acknowledged, and the fourth bit is unacknowledged. In this case, the user equipment 3 determines that the base station does not send a random access response packet to the user equipment 3 in the frame. Therefore, the user equipment 3 does not need to read a subsequent PDCCH and a related PDSCH. Similarly, assuming that the user equipment 4 determines that a bit location corresponding to a random number 1 is the fourth bit location, and a bit location corresponding to a random number 2 is the fifth bit location, the user equipment 4 finds, by reading the indication field, that both the fourth bit location and the fifth bit location are unacknowledged. In this case, the user equipment 4 may determine that the base station does not send a RACH response packet to the user equipment 4 in the frame. Therefore, the user equipment 4 can stop reading a subsequent PDCCH that may carry a random access response or random access response scheduling information. When determining that the base station may send random access response packets to the user equipment 1 and the user equipment 2 in the frame, the user equipment 1 and the user equipment 2 continue reading a PDCCH of the frame, or a PDCCH and a PDSCH resource corresponding to the PDCCH, so as to obtain the random access response packets. The user equipment 3 and the user equipment 4 may determine that the base station certainly does not send a random access response packet in the frame that can be used to send a random access response packet. Therefore, the user equipment 3 and the user equipment 4 can skip the frame, and do not read a PDCCH or a PDSCH corresponding to a PDCCH. In this example, the user equipment 1 and the user equipment 2 belong to user equipment of a first type, and the user equipment 3 and the user equipment 4 belong to user equipment of a second type.

Further, for example, a specific method for mapping, to the K bit locations in the M-bit indication field, the K numbers that are output from the K (for example, K=2) preset functions is described in the following. According to the foregoing example, the indication field is 011100. Random numbers in random access request messages corresponding to the user equipment 1 and the user equipment 2 in the user equipment of the first type are respectively r1 and r2. In this example, the two functions that are preset between the base station and the user equipment may be defined as Hash(r) and Hash(r||SuperFrame number). Hash( ) represents a hash function, and r||SuperFrame number represents a concatenation between a random number r and a superframe number corresponding to a first time period. Without loss of generality, it is assumed that output of the Hash( ) function is a number (ranging from 0 to 255) with a length of 8 bits. The user equipment 1 generates two numbers each with a length of 8 bits according to two preset functions: Hash(r1) and Hash(r1||SuperFrame number). Without loss of generality, it is assumed that the two numbers are respectively 67 and 123. The user equipment 1 separately performs modulo operations on M according to a preset rule, to separately obtain 1 and 3 that are output after the modulo operations. Therefore, the user equipment 1 determines that the K (two) bit locations corresponding to the user equipment 1 are the first bit location and the third bit location. Similarly, the user equipment 2 generates two numbers each with a length of 8 bits according to two preset functions: Hash(r2) and Hash(r2||SuperFrame number). Without loss of generality, it is assumed that the two numbers are respectively 254 and 57. The user equipment 2 separately performs modulo operations on M according to the preset rule, to separately obtain 2 and 3 that are output after the modulo operations. Therefore, the user equipment 2 determines that the K (two) bit locations corresponding to the user equipment 2 are the second bit location and the third bit location.

Random numbers in random access request messages corresponding to the user equipment 3 and the user equipment 4 in the user equipment of the second type are respectively r3 and r4. The user equipment 3 generates two numbers each with a length of 8 bits according to two preset functions: Hash(r3) and Hash(r3||SuperFrame number). Without loss of generality, it is assumed that the two numbers are respectively 21 and 100. The user equipment 3 separately performs modulo operations on M according to the preset rule, to separately obtain 3 and 4 that are output after the modulo operations. Therefore, the user equipment 3 determines that the K (two) bit locations corresponding to the user equipment 3 are the third bit location and the fourth bit location. Similarly, the user equipment 4 generates two numbers each with a length of 8 bits according to two preset functions: Hash(r4) and Hash(r4||SuperFrame number). Without loss of generality, it is assumed that the two numbers are respectively 244 and 59. The user equipment 4 separately performs modulo operations on M according to the preset rule, to separately obtain 4 and 5 that are output after the modulo operations. Therefore, the user equipment 4 determines that the K (two) bit locations corresponding to the user equipment 4 are the fourth bit location and the fifth bit location.

Figure 6:
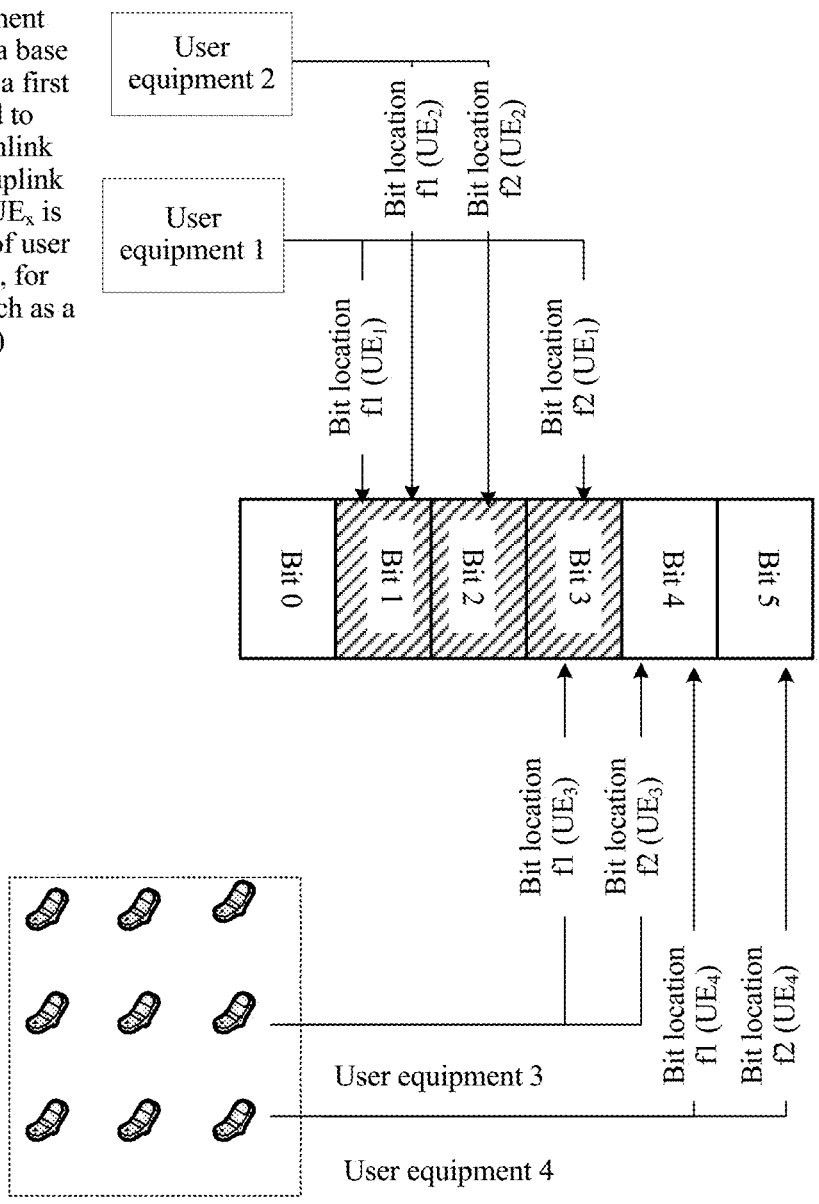
FIG. 6 is a schematic diagram of another information transmission method according to an embodiment of the present invention.

FIG. 6 is a schematic diagram of another information transmission method according to an embodiment of the present invention. Common uplink and downlink scheduling is used as an example in the method shown in FIG. 6. There are user equipment 1 and user equipment 2. Assuming that random numbers of each user equipment are determined by using two random functions, a base station may use an identifier of the user equipment as input of the random functions, so as to determine random numbers of the user equipment 1 and the user equipment 2. After separately determining the random numbers of the user equipment 1 and the user equipment 2, the base station may determine two bit locations that are in an indication field with a length of M bits and that are corresponding to the two random numbers of each user equipment. It is assumed that a value of M is 6, a random number 1 of the user equipment 1 is corresponding to the first bit location, a random number 2 of the user equipment 1 is corresponding to the third bit location, a random number 1 of the user equipment 2 is corresponding to the second bit location, and a random number 2 of the user equipment 2 is corresponding to the third bit location. In this case, values of the first bit, the second bit, and the third bit of the M bits may be set to be acknowledged. It may be understood that M bit locations in the indication field are unacknowledged in an initial state. For example, if "0" is used to represent "unacknowledged", and "1" is used to represent "acknowledged", all values of the $0^{th}$ bit to the fifth bit are 0 in an initial state of the indication field, that is, 000000. In this example, the first bit location, the second bit location, and the third bit location may be set to 1, that is, the state of the indication field is changed to 011100. After setting the indication field, the base station sends, to all user equipments that may be scheduled within a first time period, an indication field obtained after the setting. After receiving the indication field, the user equipment may determine K random numbers by using K preset random functions, determine values of K bits in the indication field that are corresponding to the K random numbers, and determine, according to the values of the K bits, whether the user equipment is scheduled on the scheduling occasion. It may be understood that the random functions and input of the random functions that are used by the user equipment are the same as random functions and input of the random functions that are used by the base station. In this case, the user equipment 1 may determine that a bit corresponding to the random number 1 is the first bit location, and a bit corresponding to the random number 2 is the third bit location. The user equipment 2 may determine that a bit corresponding to the random number 1 is the second bit location, and a bit corresponding to the random number 2 is the third bit location. In addition, if the user equipment 1 may learn, by using the indication field, that both the first bit location and the third bit location are set to be acknowledged, and the user equipment 2 learns, by using the indication field, that both the second bit location and the third bit location are set to be acknowledged, the user equipment 1 and the user equipment 2 may determine that the user equipment 1 and the user equipment 2 may be scheduled on the scheduling occasion, so as to further read and check scheduling information in a PDCCH. Assuming that user equipment 3 determines that a bit corresponding to a random number 1 is the third bit location, and a bit corresponding to a random number 2 is the fourth bit location, the user equipment 3 may determine that in the indication field, the third bit is acknowledged, and the fourth bit is unacknowledged. In this case, the user equipment 3 determines that the user equipment 3 is not scheduled on the scheduling occasion. Similarly, assuming that user equipment 4 determines that a bit corresponding to a random number 1 is the fourth bit location, and a bit corresponding to a random number 2 is the fifth bit location, the user equipment 4 may determine that both the fourth bit and the fifth bit in the indication field are unacknowledged. In this case, the user equipment 4 may determine that the user equipment 4 is not scheduled on the scheduling occasion. When determining that the user equipment 1 and the user equipment 2 may be scheduled on the scheduling occasion, the user equipment 1 and the user equipment 2 determine to read and demodulate a PDCCH in the scheduling occasion. The user equipment 1 and the user equipment 2 read corresponding scheduling information carried in the PDCCH in the scheduling occasion, so that according to an indication of the scheduling information, the user equipment 1 and the user equipment 2 further receive, on a downlink data channel (such as a PDSCH), downlink data sent by the base station, or send uplink data on an uplink data channel (such as a PUSCH). The user equipment 3 and the user equipment 4 may determine that the base station certainly does not schedule the user equipment 3 or the user equipment 4 on the scheduling occasion. Therefore, the user equipment 3 and the user equipment 4 can skip the scheduling occasion. In this example, the user equipment 1 and the user equipment 2 belong to user equipment of a first type, and the user equipment 3 and the user equipment 4 belong to user equipment of a second type.

Further, for example, a specific method for mapping, to K bit locations in the M-bit indication field, the K numbers that are output from the K (for example, K=2) preset functions is described in the following. According to the foregoing example, the indication field is 011100. User equipment IDs for scheduling that are corresponding to the user equipment 1 and the user equipment 2 in the user equipment of the first type are C-RNTI_1 and C-RNTI_2. In this example, the two functions that are preset between the base station and the user equipment may be defined as Hash(C-RNTI_1) and Hash(C-RNTI_1‖SuperFrame number). Hash( ) represents a hash function, and C-RNTI‖SuperFrame number represents a concatenation between a C-RNTI and a superframe number corresponding to the first time period. Without loss of generality, it is assumed that output of the Hash( ) function is a number (ranging from 0 to 255) with a length of 8 bits.

The user equipment 1 generates two numbers each with a length of 8 bits according to two preset functions: Hash(C-RNTI_1) and Hash(C-RNTI_1‖SuperFrame number). Without loss of generality, it is assumed that the two numbers are respectively 67 and 123. The user equipment 1 separately performs modulo operations on M according to a preset rule, to separately obtain 1 and 3 that are output after the modulo operations. Therefore, the user equipment 1 determines that the K (two) bit locations corresponding to the user equipment 1 are the first bit location and the third bit location. Similarly, the user equipment 2 generates two numbers each with a length of 8 bits according to two preset functions: Hash(C-RNTI_2) and Hash(C-RNTI_2‖SuperFrame number). Without loss of generality, it is assumed that the two numbers are respectively 254 and 57. The user equipment 2 separately performs modulo operations on M according to a preset rule, to separately obtain 2 and 3 that are output after the modulo operations. Therefore, the user equipment 2 determines that the K (two) bit locations corresponding to the user equipment 2 are the second bit location and the third bit location. User equipment IDs for scheduling that are corresponding to the user equipment 3 and the user equipment 4 in the user equipment of the second type are respectively C-RNTI_3 and C-RNTI_4. The user equipment 3 generates two numbers each with a length of 8 bits according to two preset functions: Hash(C-RNTI_3) and Hash(C-RNTI_3‖SuperFrame number). Without loss of generality, it is assumed that the two numbers are respectively 21 and 100. The user equipment 3 separately performs modulo operations on M according to the preset rule, to separately obtain 3 and 4 that are output after the modulo operations. Therefore, the user equipment 3 determines that the K (two) bit locations corresponding to the user equipment 3 are the third bit location and the fourth bit location. Similarly, the user equipment 4 generates two numbers each with a length of 8 bits according to two preset functions: Hash(C-RNTI_4) and Hash(C-RNTI_4‖SuperFrame number). Without loss of generality, it is assumed that the two numbers are respectively 244 and 59. The user equipment 4 separately performs modulo operations on M according to the preset rule, to separately obtain 4 and 5 that are output after the modulo operations. Therefore, the user equipment 4 determines that the K (two) bit locations corresponding to the user equipment 4 are the fourth bit location and the fifth bit location.

Optionally, in an embodiment, the base station may generate different indication fields for downlink information of different types. Indication fields of downlink information of all types may have different values of M and different values of K, and the indication fields of the downlink information of all the types may be corresponding to different time periods.

For example, it is assumed that the base station needs to generate different indication fields for downlink information of three types: paging signaling, a random access response used to respond to an uplink random access request, and common scheduling signaling (that is, signaling used to schedule user equipment to receive downlink data or signaling used to instruct user equipment to send uplink data). It is assumed that an indication field corresponding to the paging signaling is an indication field 1, and the indication field 1 is corresponding to M1 and K1; an indication field corresponding to a random access response message is an indication field 2, and the indication field 2 is corresponding to M2 and K2; and an indication field corresponding to the common scheduling signaling is an indication field 3, and the indication field 3 is corresponding to M3 and K3. M1, M2, and M3 may have different values, and K1, K2, and K3 may also have different values. The indication field 1, the indication field 2, and the indication field 3 may be separately corresponding to different time periods. It may be understood that M1, M2, M3, K1, K2, and K3 each are a positive integer greater than 1.

Different indication fields of downlink information of different types may be sent by using a same downlink broadcast packet or a same common downlink control information.

Optionally, in an embodiment, for a paging message, the random access response used to respond to an uplink random access request, the signaling used to schedule user equipment to receive downlink data, and the signaling used to instruct user equipment to send uplink data, a same M-bit indication field may be used to jointly indicate whether multiple types of downlink information are sent within the first time period.

Figure 7:
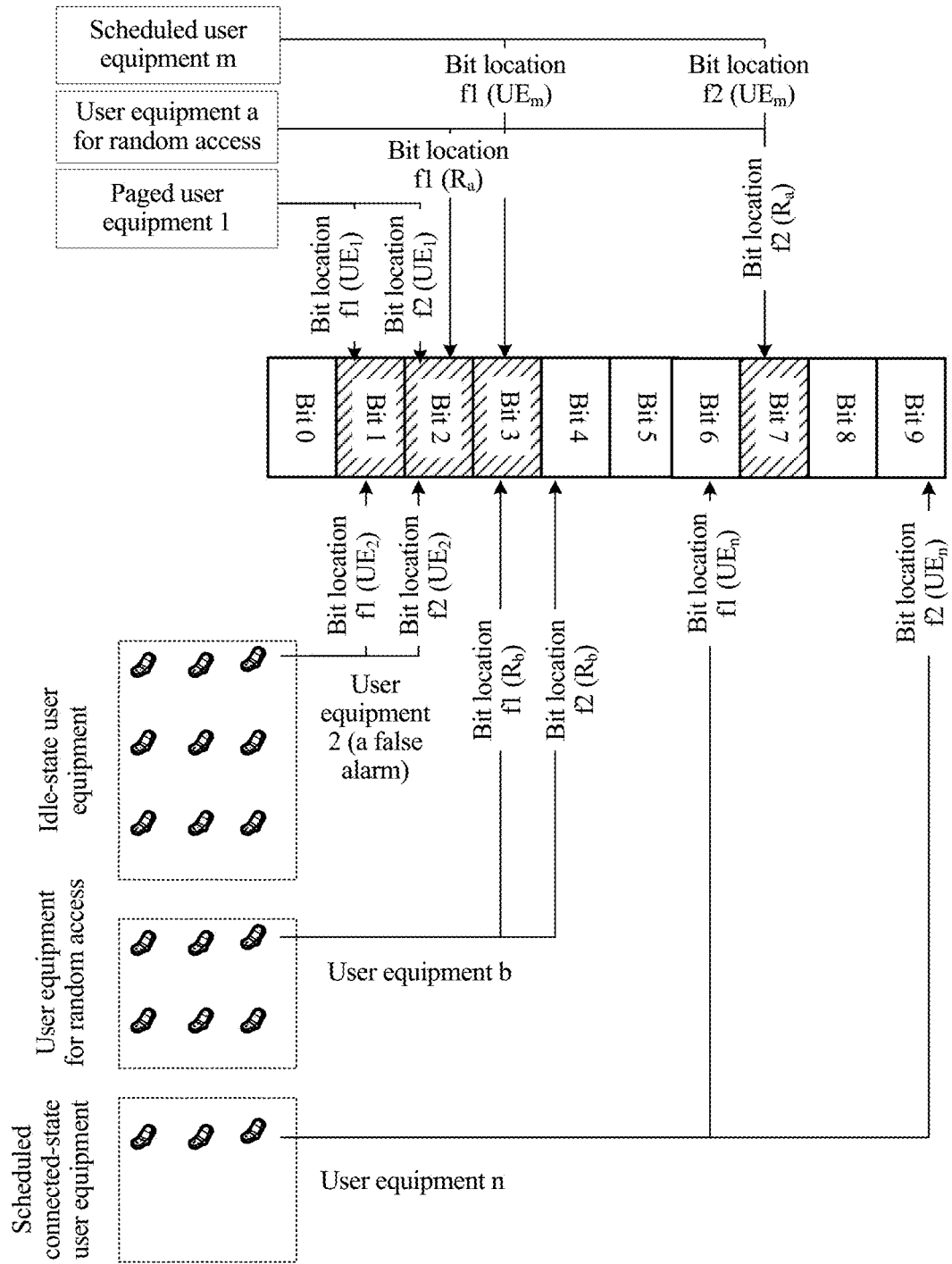
FIG. 7 is a schematic diagram of another information transmission method according to an embodiment of the present invention.

FIG. 7 is a schematic diagram of another information transmission method according to an embodiment of the present invention. Without loss of generality, a paging message, a random access response, and common uplink and downlink scheduling are used as examples in the method shown in FIG. 7. As shown in FIG. 7, it is assumed that user equipment of a first type is user equipment to which a base station sends downlink information within a first time period, and the user equipment of the first type includes user equipment 1 (where UE1 is an identifier of the user equipment 1, such as a TLLI), user equipment a (where $R_a$ is a random number in a sent random access request message), and user equipment m (where $UE_m$ is an identifier, for scheduling, of the user equipment m, such as a C-RNTI) in the example shown in FIG The user equipment 1 is idle-state user equipment paged within the first time period. The user equipment a sends a random access request message before the first time period, and a random access response message of the user equipment a is sent to the user equipment a within the first time period. The user equipment m is connected-state user equipment in an S1-based architecture or is user equipment whose ready timer does not encounter timeout in a Gb-based architecture, and the base station schedules the user equipment m within the first time period, so as to send downlink data to the user equipment m or instruct the user equipment m to send uplink data. Assuming that random numbers of each user equipment are determined by using two (K=2) random functions, the base station may use an identifier of the user equipment or a random number in random access as input of the random functions, so as to determine random numbers corresponding to the user equipment of the first type. After separately determining the random numbers of the user equipment of the first type, the base station may determine two bit locations that are in an indication field with a length of M bits and that are corresponding to two random numbers of each user equipment of the first type. It is assumed that a value of M is 10, a random number 1 of the user equipment 1 is corresponding to the first bit location, a random number 2 of the user equipment 1 is corresponding to the second bit location, a random number 1 of the user equipment a is corresponding to the second bit location, a random number 2 of the user equipment a is corresponding to the seventh bit location, a random number 1 of the user equipment m is corresponding to the third bit location, and a random number 2 of the user equipment m is corresponding to the seventh bit location. In this case, values of the first bit, the second bit, the third bit, and the seventh bit of the M bits may be set to be acknowledged. It may be understood that M bit locations in the indication field are unacknowledged in an initial state. For example, if "0" is used to represent "unacknowledged", and "1" is used to represent "acknowledged", all values of the $0^{th}$ bit to the ninth bit are 0 in an initial state of the indication field, that is, 0000000000. In this example, the first bit location, the second bit location, the third bit location, and the seventh bit location may be set to 1, that is, the state of the indication field is changed to 0111000100. After setting the indication field, the base station sends, to user equipment that may be paged, scheduled, and responded to with a random access response within the first time period, an indication field obtained after the setting.

All user equipments that may be paged, scheduled, and responded to with random access responses by the base station within the first time period obtain and check content of the indication field. After obtaining the indication field, the user equipment may determine K random numbers by using K preset random functions, determine values of K bits in the indication field that are corresponding to the K random numbers, and determine, according to the values of the K bits, whether the base station sends the downlink information to the user equipment within the first time period, so as to determine whether the user equipment needs to further read the downlink information sent by the base station. It may be understood that the random functions and input of the random functions that are used by the user equipment are the same as random functions and input of the random functions that are used by the base station.

Further, the user equipment of the first type, user equipment of a second type, and user equipment of a third type are separately described by using examples.

The user equipment 1, the user equipment a, and the user equipment m belong to the user equipment of the first type. The user equipment 1 may determine that a bit corresponding to the random number 1 is the first bit location, and a bit corresponding to the random number 2 is the second bit location. The user equipment a may determine that a bit corresponding to the random number 1 is the second bit location, and a bit corresponding to the random number 2 is the seventh bit location. The user equipment m may determine that a bit corresponding to the random number 1 is the third bit location, and a bit corresponding to the random number 2 is the seventh bit location. In addition, if the user equipment 1 may learn, by using the indication field, that both the first bit location and the second bit location are set to be acknowledged, the user equipment a learns, by using the indication field, that both the second bit location and the seventh bit location are set to be acknowledged, and the user equipment m learns, by using the indication field, that both the third bit location and the seventh bit location are set to be acknowledged, the user equipment 1, the user equipment a, and the user equipment m may determine that the base station may send the downlink information to the user equipment 1, the user equipment a, and the user equipment m within the first time period, so as to further read the downlink information. The user equipment 1 continues reading a PDCCH to obtain a paging request message. The user equipment a continues reading a PDCCH, and finds a random access response message sent to the user equipment a. The user equipment m continues reading a PDCCH, and searches scheduling information to obtain a scheduling message corresponding to the user equipment m, so as to further read a PDSCH or send uplink data on an indicated PUSCH.

User equipment b and user equipment n belong to the user equipment of the second type. Assuming that the user equipment n is connected-state user equipment in the user equipment of this type, and the user equipment n is not scheduled by the base station within the first time period, but the connected-state user equipment determines that a bit corresponding to a random number 1 is the sixth bit location, and a bit corresponding to a random number 2 is the ninth bit location, the user equipment n may determine that both the sixth bit and the ninth bit in the indication field are unacknowledged. In this case, the user equipment n may determine that the user equipment n is not scheduled by the base station on a scheduling occasion in the first time period. Assuming that the user equipment b is user equipment that is in the user equipment of this type and that initiates random access, and the base station does not feed a random access response message back to the user equipment b within the first time period, but the connected-state user equipment determines that a bit corresponding to a random number 1 is the third bit location, and a bit corresponding to a random number 2 is the fourth bit location, the user equipment n may determine that in the indication field, the third bit is acknowledged, and the fourth bit is unacknowledged. In this case, the user equipment b may determine that the base station does not feed a random access response back within the first time period, and therefore, stop reading a PDCCH.

In this example, user equipment 2 belongs to the user equipment of the third type. It is assumed that the user equipment 2 is idle-state user equipment in the user equipment of this type, and a paging occasion of the user equipment 2 is included in the first time period. Assuming that the user equipment 2 determines that a bit corresponding to a random number 1 is the first bit location, and a bit corresponding to a random number 2 is the second bit location, because the two bits are separately set for the user equipment 1 and the user equipment a in the user equipment of the first type, the user equipment 2 determines that both the first bit and the second bit in the indication field are acknowledged. In this case, the user equipment 2 may determine that the base station may send a paging request message to the user equipment 2 within the first time period, and therefore, further read a PDCCH, and find out whether there is a paging message corresponding to the user equipment 2. Because the base station actually does not send a paging request message to the user equipment 2 within the first time period, the user equipment 2 cannot find any paging message that matches an identifier of the user equipment 2, and finally, stops reading a subsequent channel.

Within the first time period, the user equipment of the first type is user equipment to which the base station actually sends the information, and in the solutions in the present invention, it is ensured that any user equipment of the first type does not miss any downlink information sent to the user equipment. The user equipment of the second type is user equipment to which the base station does not send the downlink information, and the user equipment of the second type avoids, by obtaining the indication field, reading all subsequent downlink information (such as a PDCCH), so as to reduce power consumption. The base station does not send the related downlink information to the user equipment of the third type within the first time period. However, a false alarm occurs on the user equipment of the third type. After obtaining and checking the indication field, the user equipment of the third type still reads a downlink channel such as a PDCCH. Therefore, power consumption is not reduced, but no additional overheads are caused. A proportion of the user equipment of the third type, that is, a false alarm probability may be controlled to be less than a preset threshold by selecting suitable values of M and K.

It may be understood that the values of K and M are related to average load within the first time period, that is, an average quantity of user equipments of the first type that need to be scheduled within the first time period and to which the downlink information needs to be sent within the first time period (where it is assumed that the average quantity is P', and P' herein is the average quantity of user equipments of the first type). When the average load is heavy, a value of M should be increased. When the average load is relatively light, a value of M may be properly reduced. When a value of K is determined, if the load is relatively heavy, it is very likely that most bit locations in the M bits are set to be acknowledged for P' user equipments. In this case, for user equipment that is not scheduled by the base station within the first time period or user equipment to which the base station does not send the downlink information within the first time period, there is a higher probability that K bit locations corresponding to the user equipment are set to be acknowledged (where there is a false alarm in this case). Therefore, when the load becomes heavier, a bit quantity (that is, the value of M) of the indication field should be properly increased. An optimal value of the value of K is actually related to the average load quantity P' and the value of M. Therefore, when the average load changes, the base station or another network device should be allowed to update the value of K and/or the value of M and send an updated value of K and/or an updated value of M to all user equipments that need to read the indication field.

Further, the base station may adjust the value of K and/or the value of M as required. If a smaller quantity (where it is assumed that the quantity is P) of user equipments need to be scheduled, the value of M may be properly reduced. If a larger quantity of user equipments need to be scheduled, the value of M may be properly increased to reduce a false alarm probability. Correspondingly, for different values of M and different quantities of user equipments that need to be scheduled, the base station may obtain optimal values or better values of K. For example, the value of K may be $$\left\lfloor \frac{M}{P} \ln 2 \right\rfloor.$$

Certainly, optionally, to reduce implementation complexity, the value of K may be simply fixed at 2 or 3. The base station may send the determined value of M to all the user equipments that need to read the indication field. Optionally, the base station may send the value of K to all the user equipments that need to read the indication field. Optionally, the base station may send the value of K or the value of M to the user equipments in a broadcast manner, or the base station may directly send the value of K or the value of M to the user equipments.

Further, the indication field may be broadcast by using a Physical Broadcast Channel (PBCH), or may be periodically sent on a PDCCH by using a common downlink control information (common DCI) or a common PDCCH message.

Figure 8:
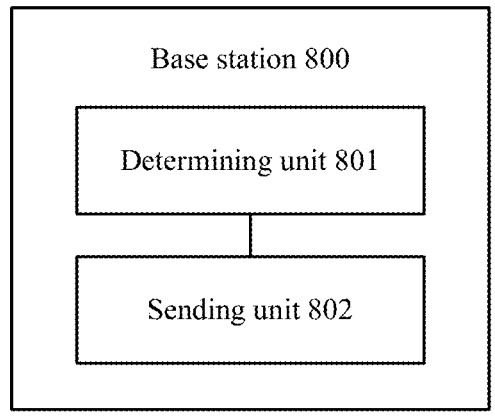
FIG. 8 is a structural block diagram of a base station according to an embodiment of the present invention.

FIG. 8 is a structural block diagram of a base station according to an embodiment of the present invention. As shown in FIG. 8, a base station 800 includes a determining unit 801 and a sending unit 802.

The determining unit 801 is configured to determine that the base station sends downlink information to P user equipments of at least one user equipment within a first time period.

The determining unit 801 is further configured to generate an indication field according to the determined P user equipments. The indication field includes M bits, each of the at least one user equipment is corresponding to K bits of the M bits, the K bits are used to indicate whether the corresponding user equipment needs to receive and read the downlink information sent by the base station within the first time period, M is a positive integer greater than 1, K is a positive integer greater than 1 and less than M, and P is an integer greater than or equal to 0.

The sending unit 802 is configured to send the indication field to the at least one user equipment.

The base station 800 shown in FIG. 8 may indicate, to each user equipment by using an indication field, whether the base station sends downlink information to the user equipment within a first time period. When the user equipment responds that the user equipment receives the indication field from the base station, if the user equipment determines that the user equipment does not need to receive or read the downlink information within the first time period, the user equipment may not monitor or receive a corresponding channel. In this way, user equipment power consumption can be reduced to save power.

Specifically, the at least one user equipment may include user equipment of a first type and/or user equipment of a second type. The P user equipments of the at least one user equipment may be referred to as the user equipment of the first type. The user equipment of the first type is a type of user equipment that is of the at least one user equipment and to which the base station determines to send the downlink information within the first time period. For example, assuming that the downlink information that needs to be sent within the first time period is a paging message, the base station may determine, according to signaling of a core network, user equipments that need to be paged within the first time period, so as to determine that the user equipments are the user equipment of the first type. For another example, assuming that the downlink information that needs to be sent is common scheduling information of uplink data or downlink data, and the first time period is a scheduling cycle, the base station determines, according to a scheduling algorithm, user equipments scheduled within the first time period, and uses the user equipments as the user equipment of the first type. For still another example, assuming that the first time period is a time period after an uplink random access resource, and the downlink information that needs to be sent is a random access response packet used to respond to a random access request packet sent by user equipment, the base station selects, for access according to uplink resource availability, user equipments corresponding to several random access request packets, and feeds random access response packets back to the user equipments within the first time period, and the base station determines that the user equipments are the user equipment of the first type. The user equipment of the second type is user equipment to which the base station does not send the downlink information within the first time period.

Specifically, for connected-state user equipment, the base station 800 is a serving base station of the connected-state user equipment. For idle-state user equipment, the base station 800 is a base station in which a cell that the idle-state user equipment camps on is located.

All values of the M bits are unacknowledged in an initial state of the indication field. The determining unit 801 may set, to be acknowledged according to the P user equipments, all values of K bits corresponding to each of the P user equipments.

Optionally, in an embodiment, K bit locations corresponding to each of the at least one user equipment are preconfigured by the determining unit 801, and the sending unit 802 may send a configuration result to the corresponding user equipment.

Optionally, in another embodiment, the determining unit 801 is specifically configured to: determine input information of K preset functions of $i^{th}$ user equipment of the P user equipments, where i=1, ... , P; generate, according to the input information of the K preset functions of the $i^{th}$ user equipment and the K preset functions of the $i^{th}$ user equipment, K numbers corresponding to the $i^{th}$ user equipment, where the K numbers are used to indicate locations of K bits corresponding to the $i^{th}$ user equipment in the M bits; and set, the bit locations corresponding to the K numbers in the M bits to be acknowledged.

Optionally, in an embodiment, the K preset functions are K preset random functions, and the K numbers are K random numbers. In this case, because the preset functions are random functions, the generated numbers are random numbers. Therefore, corresponding random numbers can be generated for different user equipments, so that a false alarm probability can be reduced.

Optionally, in another embodiment, the K preset functions are K preset hash functions.

Optionally, in another embodiment, the K preset functions are K hash functions or the K hash functions modulo M.

Optionally, in another embodiment, the K preset functions are functions in which input of each preset function is equiprobably mapped to M output values.

Optionally, a type of the downlink information is any one of the following: paging signaling, a random access response used to respond to an uplink random access request, signaling used to schedule user equipment to receive downlink data, or signaling used to instruct user equipment to send uplink data.

Optionally, in an embodiment, the input information of the K preset functions of the $i^{th}$ user equipment may be corresponding to the type of the downlink information. That is, the determining unit 801 may determine the input information of the K preset functions of the $i^{th}$ user equipment according to the type of the downlink information.

Specifically, if the downlink information is the paging signaling, the input information of the K preset functions of the $i^{th}$ user equipment includes at least one of the following: an identifier of user equipment of the first type, which is corresponding to the paging signaling, or system time information. The system time information includes any one or more of the following: a system superframe number, a system frame number, or a system subframe number.

Specifically, if the downlink information is the random access response used to respond to an uplink random access request, the input information of the K preset functions of the $i^{th}$ user equipment includes at least one of the following: identifier information in the random access request, or system time information. The system time information includes any one or more of the following: a system superframe number, a system frame number, or a system subframe number. Optionally, the identifier information in the random access request is a random number included in the random access request, or is an index value corresponding to an access sequence corresponding to the random access request.

Specifically, if the downlink information is the signaling used to schedule user equipment to receive downlink data or is the signaling used to instruct user equipment to send uplink data, the input information of the K preset functions of the $i^{th}$ user equipment includes at least one of the following: an identifier of user equipment, which is corresponding to the signaling, of the first type, or system time information. The system time information includes any one or more of the following: a system superframe number, a system frame number, or a system subframe number.

Optionally, in another embodiment, the input information of the K preset functions of the $i^{th}$ user equipment may be corresponding to a state of the $i^{th}$ user equipment. That is, the determining unit 801 may determine the input information of the K preset functions of the $i^{th}$ user equipment according to the state of the $i^{th}$ user equipment.

Specifically, if the $i^{th}$ user equipment is in an air-interface idle state, the input information of the K preset functions of the $i^{th}$ user equipment includes at least one of the following: an International Mobile Subscriber Identity (IMSI) of each user equipment of the first type, or a temporary logical link identifier of each user equipment of the first type. If the $i^{th}$ user equipment is in an air-interface connected state, the input information of the K preset functions of the $i^{th}$ user equipment includes a connected-state identifier of each user equipment of the first type. The connected-state identifier may be a cell radio network temporary identifier (C-RNTI).

Optionally, in another embodiment, the determining unit 801 may determine the input information of the K preset functions of the $i^{th}$ user equipment according to a preset rule.

Specifically, that the determining unit 801 determines the input information of the K preset functions of the $i^{th}$ user equipment according to the preset rule includes: prespecified user equipment identifier information (such as an IMSI or a TLLI) is used as at least one piece of input information of the preset functions according to the preset rule; further, time information may also be used as input information of some or all of the K preset functions according to the preset rule; and still further, an index number of the type of the downlink information may also be used as input information of some or all of the K preset functions according to the preset rule.

Further, the determining unit 801 is configured to determine a value of K and a value of M. The sending unit 802 is further configured to send the value of K and the value of M to the user equipment.

Optionally, the sending unit 802 is specifically configured to send the indication field to the user equipment on a broadcast channel PBCH and/or a physical downlink control channel PDCCH.

Figure 9:
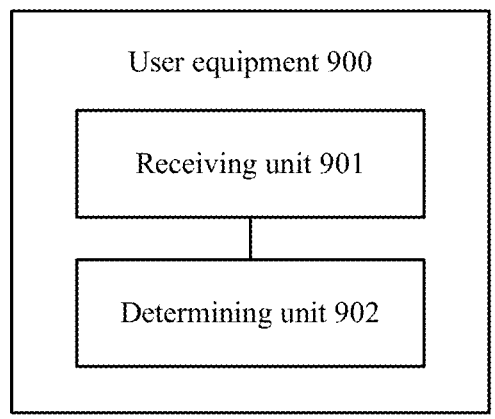
FIG. 9 is a structural block diagram of user equipment according to an embodiment of the present invention.

FIG. 9 is a structural block diagram of user equipment according to an embodiment of the present invention. As shown in FIG. 9, user equipment 900 includes a receiving unit 901 and a determining unit 902.

The receiving unit 901 is configured to receive an indication field that has a length of M bits and that is sent by a base station.

The determining unit 902 is configured to determine locations of K bits corresponding to the user equipment in the M bits. M is a positive integer greater than 1, and K is a positive integer greater than 1 and less than M.

The determining unit 902 is further configured to determine, according to values of the K bits, whether the user equipment receives and reads downlink information sent by the base station within a first time period.

The user equipment 900 shown in FIG. 9 may determine, according to the indication field, whether the user equipment needs to receive and read the downlink information sent by the base station within the first time period. If determining that the user equipment needs to receive and read the downlink information sent by the base station, the user equipment monitors a corresponding channel within the first time period. If determining that the user equipment does not need to receive or read the downlink information sent by the base station, the user equipment may not monitor a corresponding channel within the first time period. In addition, multiple bit locations are used to indicate whether one user equipment needs to receive and read scheduling control information and a corresponding data channel within the first time period, so that an unnecessary false alarm can be reduced.

The determining unit 902 is specifically configured to: determine input information of K preset functions; generate, according to the input information of the K preset functions and the K preset functions, K numbers corresponding to the user equipment, where the K numbers are used to indicate the locations of the K bits corresponding to the user equipment in the M bits; and determine the K bit locations corresponding to the K numbers in the M bits.

Optionally, the K preset functions are K preset random functions, and the K numbers are K random numbers.

Optionally, in another embodiment, the K preset functions are K preset hash functions.

Optionally, in another embodiment, the K preset functions are K hash functions or the K hash functions modulo M.

Optionally, in another embodiment, the K preset functions are functions in which input of each preset function is equiprobably mapped to M output values.

The determining unit 902 is specifically configured to: determine whether all the values of the K bits are acknowledged; and if determining that all the values of the K bits are acknowledged, determine that the user equipment receives and reads the downlink information sent by the base station within the first time period; or if determining that at least one of the values of the K bits is unacknowledged, determine that the user equipment does not receive or read the downlink information sent by the base station within the first time period.

Optionally, the downlink information sent by the base station within the first time period is any one of the following: paging signaling, a random access response used to respond to an uplink random access request, signaling used to schedule user equipment to receive downlink data, or signaling used to instruct user equipment to send uplink data.

Optionally, in an embodiment, the input information of the K preset functions may be corresponding to a type of the downlink information. That is, the determining unit 902 may determine the input information of the K preset functions according to the type of the downlink information.

Specifically, if the downlink information is the paging signaling, the input information of the K preset functions of the $i^{th}$ user equipment includes at least one of the following: an identifier of the user equipment corresponding to the paging signaling, or system time information. The system time information includes any one or more of the following: a system superframe number, a system frame number, or a system subframe number. All user equipments may have different identifiers, so that a relatively low probability of outputting same K numbers based on K preset functions can be ensured. In particular, for some functions (such as a hash function), if input is different, there is a quite high probability that output is different. Therefore, the relatively low probability of outputting same K numbers for different user equipments can be further ensured, and then a false alarm is avoided.

Specifically, if the downlink information is the random access response used to respond to an uplink random access request, the input information of the K preset functions of the $i^{th}$ user equipment includes at least one of the following: identifier information in the random access request, or system time information. The system time information includes any one or more of the following: a system superframe number, a system frame number, or a system subframe number. Optionally, the identifier information in the random access request is a random number included in the random access request, or is an index value corresponding to an access sequence corresponding to the random access request. According to an agreement between the base station and the user equipment, the identifier information in the random access request is the random number included in the random access request, or is the index value corresponding to the access sequence corresponding to the random access request. Random access requests of all user equipments of the first type may have different identifier information, so that there is a relatively low probability of outputting same K numbers based on K preset functions. In particular, for some functions (such as a hash function), if input is different, there is a quite high probability that output is different. Therefore, the relatively low probability of outputting same K numbers for different user equipments can be further ensured, and then a false alarm is avoided.

Specifically, if the downlink information is the signaling used to schedule user equipment to receive downlink data or is the signaling used to instruct user equipment to send uplink data, the input information of the K preset functions of the $i^{th}$ user equipment includes at least one of the following: an identifier of the user equipment corresponding to the signaling, or system time information. The system time information includes any one or more of the following: a system superframe number, a system frame number, or a system subframe number. All user equipments of the first type have different identifiers, so that there is a relatively low probability of outputting same K numbers based on K preset functions. In particular, for some functions (such as a hash function), if input is different, there is a quite high probability that output is different. Therefore, the relatively low probability of outputting same K numbers for different user equipments can be further ensured, and then a false alarm is avoided.

Optionally, in another embodiment, the input information of the K preset functions is corresponding to a state of the user equipment. That is, the determining unit 902 may determine the input information of the K preset functions according to the state of the user equipment.

Specifically, when the user equipment is in an air-interface idle state, the input information of the K preset functions includes at least one of the following: an International Mobile Subscriber Identity of the user equipment or a temporary logical link identifier of the user equipment. When the user equipment is in an air-interface connected state, the input information of the K preset functions is a connected-state identifier of the user equipment.

Optionally, in another embodiment, the determining unit 902 may determine the input information of the K preset functions according to a preset rule.

Optionally, the receiving unit 901 is further configured to receive a value of K and a value of M that are sent by the base station.

Figure 10:
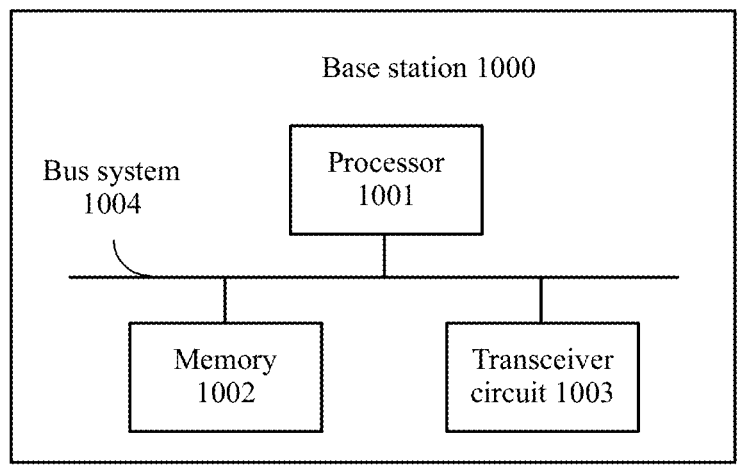
FIG. 10 is a structural block diagram of a base station according to an embodiment of the present invention.

FIG. 10 is a structural block diagram of a base station according to an embodiment of the present invention. As shown in FIG. 10, a base station 1000 includes a processor 1001, a memory 1002, and a transceiver circuit 1003.

Components of the base station 1000 are coupled together by using a bus system 1004. In addition to a data bus, the bus system 1004 includes a power bus, a control bus, and a status signal bus. However, for clarity of description, various buses are marked as the bus system 1004 in FIG. 10.

The method disclosed in the foregoing embodiment of the present invention may be applied to the processor 1001, or implemented by the processor 1001. The processor 1001 may be an integrated circuit chip and has a signal processing capability. In an implementation process, the steps of the foregoing methods may be completed by using an integrated logic circuit of hardware in the processor 1001 or an instruction in a form of software. The processor 1001 may be a general purpose processor, a digital signal processor (DSP), an application-specific integrated circuit (ASIC), a field programmable gate array (FPGA) or another programmable logic component, a discrete gate or a transistor logic component, or a discrete hardware component. The processor 1001 may implement or execute the methods, steps, and logical block diagrams that are disclosed in the embodiments of the present invention. The general purpose processor may be a microprocessor; or the processor may be any conventional processor or the like. The steps of the methods disclosed with reference to the embodiments of the present invention may be directly executed and completed by a hardware decoding processor, or may be executed and completed by using a combination of a hardware module and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1002. The processor 1001 reads an instruction in the memory 1002, and completes the steps of the foregoing methods in combination with the hardware in the processor.

The processor 1001 is configured to determine that the base station sends downlink information to P user equipments of at least one user equipment within a first time period.

The processor 1001 is further configured to generate an indication field according to the determined P user equipments. The indication field includes M bits, each of the at least one user equipment is corresponding to K bits of the M bits, the K bits are used to indicate whether the corresponding user equipment needs to receive and read the downlink information sent by the base station within the first time period, M is a positive integer greater than 1, K is a positive integer greater than 1 and less than M, and P is an integer greater than or equal to 0.

The transceiver circuit 1003 is configured to send the indication field to the at least one user equipment.

The base station 1000 shown in FIG. 10 may indicate, to each user equipment by using an indication field, whether the base station sends downlink information to the user equipment within a first time period. When the user equipment responds that the user equipment receives the indication field from the base station, if the user equipment determines that the user equipment does not need to receive or read the downlink information within the first time period, the user equipment may not monitor or receive a corresponding channel. In this way, user equipment power consumption can be reduced to save power.

Specifically, the at least one user equipment may include user equipment of a first type and/or user equipment of a second type. The P user equipments of the at least one user equipment may be referred to as the user equipment of the first type. The user equipment of the first type is a type of user equipment that is of the at least one user equipment and to which the base station determines to send the downlink information within the first time period. For example, assuming that the downlink information that needs to be sent within the first time period is a paging message, the base station may determine, according to signaling of a core network, user equipments that need to be paged within the first time period, so as to determine that the user equipments are the user equipment of the first type. For another example, assuming that the downlink information that needs to be sent is common scheduling information of uplink data or downlink data, and the first time period is a scheduling cycle, the base station determines, according to a scheduling algorithm, user equipments scheduled within the first time period, and uses the user equipments as the user equipment of the first type. For still another example, assuming that the first time period is a time period after an uplink random access resource, and the downlink information that needs to be sent is a random access response packet used to respond to a random access request packet sent by user equipment, the base station selects, for access according to uplink resource availability, user equipments corresponding to several random access request packets, and feeds random access response packets back to the user equipments within the first time period, and the base station determines that the user equipments are the user equipment of the first type. The user equipment of the second type is user equipment to which the base station does not send the downlink information within the first time period.

Specifically, for connected-state user equipment, the base station 1000 is a serving base station of the connected-state user equipment. For idle-state user equipment, the base station 1000 is a base station in which a cell that the idle-state user equipment camps on is located.

All values of the M bits are unacknowledged in an initial state of the indication field. The processor 1001 may set, to be acknowledged according to the P user equipments, all values of K bits corresponding to each of the P user equipments.

Optionally, in an embodiment, K bit locations corresponding to each of the at least one user equipment are preconfigured by the processor 1001, and the transceiver circuit 1003 may send a configuration result to the corresponding user equipment.

Optionally, in another embodiment, the processor 1001 is specifically configured to: determine input information of K preset functions of $i^{th}$ user equipment of the P user equipments, where i=1, . . . , P; generate, according to the input information of the K preset functions of the $i^{th}$ user equipment and the K preset functions of the $i^{th}$ user equipment, K numbers corresponding to the $i^{th}$ user equipment, where the K numbers are used to indicate locations of K bits corresponding to the $i^{th}$ user equipment in the M bits; and set, the bit locations corresponding to the K numbers in the M bits to be acknowledged.

Optionally, in an embodiment, the K preset functions are K preset random functions, and the K numbers are K random numbers. In this case, because the preset functions are random functions, the generated numbers are random numbers. Therefore, corresponding random numbers can be generated for different user equipments, so that a false alarm probability can be reduced.

Optionally, in another embodiment, the K preset functions are K preset hash functions.

Optionally, in another embodiment, the K preset functions are K hash functions or the K hash functions modulo M.

Optionally, in another embodiment, the K preset functions are functions in which input of each preset function is equiprobably mapped to M output values.

Optionally, a type of the downlink information is any one of the following: paging signaling, a random access response used to respond to an uplink random access request, signaling used to schedule user equipment to receive downlink data, or signaling used to instruct user equipment to send uplink data.

Optionally, in an embodiment, the input information of the K preset functions of the $i^{th}$ user equipment may be corresponding to the type of the downlink information. That is, the processor 1001 may determine the input information of the K preset functions of the $i^{th}$ user equipment according to the type of the downlink information.

Specifically, if the downlink information is the paging signaling, the input information of the K preset functions of the $i^{th}$ user equipment includes at least one of the following: an identifier of user equipment, which is corresponding to the paging signaling, of the first type, or system time information. The system time information includes any one or more of the following: a system superframe number, a system frame number, or a system subframe number.

Specifically, if the downlink information is the random access response used to respond to an uplink random access request, the input information of the K preset functions of the $i^{th}$ user equipment includes at least one of the following: identifier information in the random access request, or system time information. The system time information includes any one or more of the following: a system superframe number, a system frame number, or a system subframe number. Optionally, the identifier information in the random access request is a random number included in the random access request, or is an index value corresponding to an access sequence corresponding to the random access request.

Specifically, if the downlink information is the signaling used to schedule user equipment to receive downlink data or is the signaling used to instruct user equipment to send uplink data, the input information of the K preset functions of the $i^{th}$ user equipment includes at least one of the following: an identifier of user equipment, which is corresponding to the signaling, of the first type, or system time information. The system time information includes any one or more of the following: a system superframe number, a system frame number, or a system subframe number.

Optionally, in another embodiment, the input information of the K preset functions of the $i^{th}$ user equipment may be corresponding to a state of the $i^{th}$ user equipment. That is, the processor 1001 may determine the input information of the K preset functions of the $i^{th}$ user equipment according to the state of the $i^{th}$ user equipment.

Specifically, if the $i^{th}$ user equipment is in an air-interface idle state, the input information of the K preset functions of the $i^{th}$ user equipment includes at least one of the following: an International Mobile Subscriber Identity (IMSI) of each user equipment of the first type, or a temporary logical link identifier of each user equipment of the first type. If the $i^{th}$ user equipment is in an air-interface connected state, the input information of the K preset functions of the $i^{th}$ user equipment includes a connected-state identifier of each user equipment of the first type. The connected-state identifier may be a cell radio network temporary identifier (C-RNTI).

Optionally, in another embodiment, the processor 1001 may determine the input information of the K preset functions of the $i^{th}$ user equipment according to a preset rule.

Specifically, that the processor 1001 determines the input information of the K preset functions of the $i^{th}$ user equipment according to the preset rule includes: prespecified user equipment identifier information (such as an IMSI or a TLLI) is used as at least one piece of input information of the preset functions according to the preset rule; further, time information may also be used as input information of some or all of the K preset functions according to the preset rule; and still further, an index number of the type of the downlink information may also be used as input information of some or all of the K preset functions according to the preset rule.

Further, the processor 1001 is configured to determine a value of K and a value of M. The transceiver circuit 1003 is further configured to send the value of K and the value of M to the user equipment.

Optionally, the transceiver circuit 1003 is specifically configured to send the indication field to the user equipment on a broadcast channel PBCH and/or a physical downlink control channel PDCCH.

Figure 11:
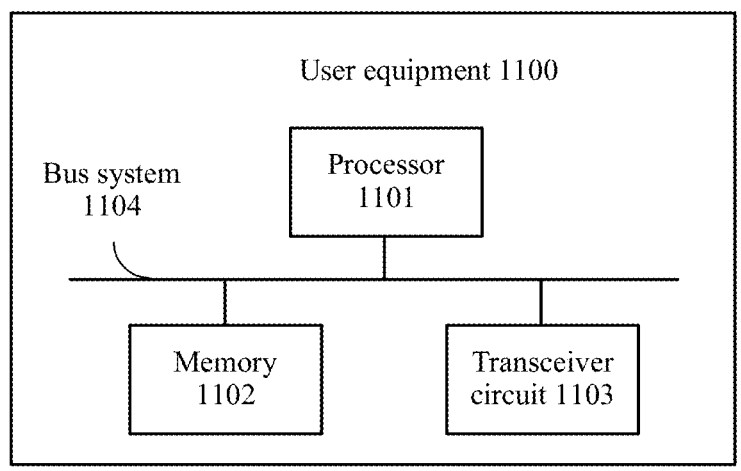
FIG. 11 is a structural block diagram of user equipment according to an embodiment of the present invention.

FIG. 11 is a structural block diagram of user equipment according to an embodiment of the present invention. As shown in FIG. 11, user equipment 1100 includes a processor 1101, a memory 1102, and a transceiver circuit 1103.

Components of the user equipment 1100 are coupled together by using a bus system 1104. In addition to a data bus, the bus system 1104 includes a power bus, a control bus, and a status signal bus. However, for clarity of description, various buses are marked as the bus system 1104 in FIG. 11.

The method disclosed in the foregoing embodiment of the present invention may be applied to the processor 1101, or implemented by the processor 1101. The processor 1101 may be an integrated circuit chip and has a signal processing capability. In an implementation process, the steps of the foregoing methods may be completed by using an integrated logic circuit of hardware in the processor 1101 or an instruction in a form of software. The processor 1101 may be a general purpose processor, a digital signal processor (DSP), an application-specific integrated circuit (ASIC), a field programmable gate array (FPGA) or another programmable logic component, a discrete gate or a transistor logic component, or a discrete hardware component. The processor 1101 may implement or execute the methods, steps, and logical block diagrams that are disclosed in the embodiments of the present invention. The general purpose processor may be a microprocessor; or the processor may be any conventional processor or the like. The steps of the methods disclosed with reference to the embodiments of the present invention may be directly executed and completed by a hardware decoding processor, or may be executed and completed by using a combination of a hardware module and a software module in a decoding processor. The software module may be located in a mature storage medium in the art, such as a random access memory (RAM), a flash memory, a read-only memory (ROM), a programmable read-only memory, an electrically erasable programmable memory, or a register. The storage medium is located in the memory 1102. The processor 1101 reads an instruction in the memory 1102, and completes the steps of the foregoing methods in combination with the hardware in the processor.

The transceiver circuit 1103 is configured to receive an indication field that has a length of M bits and that is sent by a base station.

The processor 1101 is configured to determine locations of K bits corresponding to the user equipment in the M bits. M is a positive integer greater than 1, and K is a positive integer greater than 1 and less than M.

The processor 1101 is further configured to determine, according to values of the K bits, whether the user equipment receives and reads downlink information sent by the base station within a first time period.

The user equipment 1100 shown in FIG. 11 may determine, according to the indication field, whether the user equipment needs to receive and read the downlink information sent by the base station within the first time period. If determining that the user equipment needs to receive and read the downlink information sent by the base station, the user equipment monitors a corresponding channel within the first time period. If determining that the user equipment does not need to receive or read the downlink information sent by the base station, the user equipment may not monitor a corresponding channel within the first time period. In addition, multiple bit locations are used to indicate whether one user equipment needs to receive and read scheduling control information and a corresponding data channel within the first time period, so that an unnecessary false alarm can be reduced.

The processor 1101 is specifically configured to: determine input information of K preset functions; generate, according to the input information of the K preset functions and the K preset functions, K numbers corresponding to the user equipment, where the K numbers are used to indicate the locations of the K bits corresponding to the user equipment in the M bits; and determine the K bit locations corresponding to the K numbers in the M bits.

Optionally, the K preset functions are K preset random functions, and the K numbers are K random numbers.

Optionally, in another embodiment, the K preset functions are K preset hash functions.

Optionally, in another embodiment, the K preset functions are K hash functions or the K hash functions modulo M.

Optionally, in another embodiment, the K preset functions are functions in which input of each preset function is equiprobably mapped to M output values.

The processor 1101 is specifically configured to: determine whether all the values of the K bits are acknowledged; and if determining that all the values of the K bits are acknowledged, determine that the user equipment receives and reads the downlink information sent by the base station within the first time period; or if determining that at least one of the values of the K bits is unacknowledged, determine that the user equipment does not receive or read the downlink information sent by the base station within the first time period.

Optionally, the downlink information sent by the base station within the first time period is any one of the following: paging signaling, a random access response used to respond to an uplink random access request, signaling used to schedule user equipment to receive downlink data, or signaling used to instruct user equipment to send uplink data.

Optionally, in an embodiment, the input information of the K preset functions may be corresponding to a type of the downlink information. That is, the processor 1101 may determine the input information of the K preset functions according to the type of the downlink information.

Specifically, if the downlink information is the paging signaling, the input information of the K preset functions of the $i^{th}$ user equipment includes at least one of the following: an identifier of the user equipment corresponding to the paging signaling, or system time information. The system time information includes any one or more of the following: a system superframe number, a system frame number, or a system subframe number. All user equipments may have different identifiers, so that a relatively low probability of outputting same K numbers based on K preset functions can be ensured. In particular, for some functions (such as a hash function), if input is different, there is a quite high probability that output is different. Therefore, the relatively low probability of outputting same K numbers for different user equipments can be further ensured, and then a false alarm is avoided.

Specifically, if the downlink information is the random access response used to respond to an uplink random access request, the input information of the K preset functions of the $i^{th}$ user equipment includes at least one of the following: identifier information in the random access request, or system time information. The system time information includes any one or more of the following: a system superframe number, a system frame number, or a system subframe number. Optionally, the identifier information in the random access request is a random number included in the random access request, or is an index value corresponding to an access sequence corresponding to the random access request. According to an agreement between the base station and the user equipment, the identifier information in the random access request is the random number included in the random access request, or is the index value corresponding to the access sequence corresponding to the random access request. Random access requests of all user equipments of the first type may have different identifier information, so that there is a relatively low probability of outputting same K numbers based on K preset functions. In particular, for some functions (such as a hash function), if input is different, there is a quite high probability that output is different. Therefore, the relatively low probability of outputting same K numbers for different user equipments can be further ensured, and then a false alarm is avoided.

Specifically, if the downlink information is the signaling used to schedule user equipment to receive downlink data or is the signaling used to instruct user equipment to send uplink data, the input information of the K preset functions of the $i^{th}$ user equipment includes at least one of the following: an identifier of the user equipment corresponding to the signaling, or system time information. The system time information includes any one or more of the following: a system superframe number, a system frame number, or a system subframe number. All user equipments of the first type have different identifiers, so that there is a relatively low probability of outputting same K numbers based on K preset functions. In particular, for some functions (such as a hash function), if input is different, there is a quite high probability that output is different. Therefore, the relatively low probability of outputting same K numbers for different user equipments can be further ensured, and then a false alarm is avoided.

Optionally, in another embodiment, the input information of the K preset functions is corresponding to a state of the user equipment. That is, the processor 1101 may determine the input information of the K preset functions according to the state of the user equipment.

Specifically, when the user equipment is in an air-interface idle state, the input information of the K preset functions includes at least one of the following: an International Mobile Subscriber Identity of the user equipment or a temporary logical link identifier of the user equipment. When the user equipment is in an air-interface connected state, the input information of the K preset functions is a connected-state identifier of the user equipment.

Optionally, in another embodiment, the processor 1101 may determine the input information of the K preset functions according to a preset rule.

Optionally, the transceiver circuit 1103 is further configured to receive a value of K and a value of M that are sent by the base station.

A person of ordinary skill in the art may be aware that, in combination with the examples described in the embodiments disclosed in this specification, units and algorithm steps can be implemented by electronic hardware or a combination of computer software and electronic hardware. Whether the functions are performed in a hardware manner or a software manner depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on a plurality of network units. Some or all of the units may be selected according to actual needs to achieve the objectives of the solutions in the embodiments.

In addition, function units in the embodiments of the present invention may be integrated into one processing unit, or each of the units may exist alone physically, or two or more units are integrated into one unit.

When being implemented in a form of a software function unit and sold or used as an independent product, the functions may be stored in a computer-readable storage medium. Based on such an understanding, the technical solutions in the present invention essentially, or the part contributing to the prior art, or some of the technical solutions may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An information transmission method carried out by a base station, the method comprising:
   configuring a timing relationship for a user equipment, wherein the timing relationship defines a preset time prior to a start time of a scheduling cycle;
   sending, on a first physical downlink control channel (PDCCH), an indication field to the user equipment at the preset time prior to the start time of the scheduling cycle, wherein:
      the indication field comprises M bits,
      the user equipment corresponds to K bits of the M bits,
      the K bits indicate whether the user equipment needs to receive downlink information from the base station within the scheduling cycle,
      M is a positive integer greater than 1, and
      K is a positive integer greater than 1 and less than M; and
   sending, in accordance with a value of the K bits, the downlink information to the user equipment within the scheduling cycle on a second PDCCH,
   wherein the downlink information is scheduling information for scheduling the user equipment to transfer uplink data or downlink data.

2. The method according to claim 1, wherein the indication field is periodically sent, and
   wherein the indication field sending cycle is preset between the base station and the user equipment in a preconfigured or predefined manner.

3. The method according to claim 1, wherein the user equipment is in a connected state.

4. An information transmission method carried out by a user equipment, the method comprising:
   receiving, in accordance with a configured timing relationship for the user equipment defining a preset time prior to a start time of a scheduling cycle, an indication field from a base station on a first physical downlink control channel (PDCCH), wherein:
      the indication field comprises M bits,
      the user equipment corresponds to K bits of the M bits,
      the K bits indicate whether the user equipment needs to receive downlink information from the base station within the scheduling cycle,
      M is a positive integer greater than 1, and
      K is a positive integer greater than 1 and less than M; and
   receiving, in accordance with a value of the K bits, downlink information from the base station within the scheduling cycle on a second PDCCH,
   wherein the downlink information is scheduling information for scheduling the user equipment to transfer uplink data or downlink data.

5. The method according to claim 4, wherein the user equipment is in a connected state.

6. The method according to claim 4, wherein a type of the downlink information can be any one of the following:
   paging signaling,
   a random access response used to respond to an uplink random access request,
   signaling used to schedule the user equipment to receive downlink data, and
   signaling used to instruct the user equipment to send uplink data.

7. The method according to claim 6, further comprising:
   determining that the downlink information is the paging signaling,
   determining, in accordance with the determining that the downlink information is the paging signaling, input information of K preset functions that comprises at least one of the group consisting of:
      an identifier of the user equipment, and
      system time information.

8. The method according to claim 6, further comprising:
   determining that the downlink information is the random access response used to respond to an uplink random access request,
   determining, in accordance with the determining that the downlink information is the random access response, input information of K preset functions that comprises at least one of the group consisting of:
      identifier information in the random access request, and
      system time information.

9. The method according to claim 6, further comprising:
   determining that the downlink information is the signaling used to schedule the user equipment to receive downlink data or is the signaling used to instruct the user equipment to send the uplink data, and
   determining, in accordance with the determining that the downlink information is the signaling for receiving the downlink data or sending the uplink data, input information of K preset functions that comprises at least one of the group consisting of:
      an identifier of the user equipment, and
      system time information.

10. The method according to claim 4, further comprising:
    receiving, from the base station, a timing relationship for the at least one user equipment, wherein the timing relationship defines the preset time prior to the start time of the scheduling cycle.

11. A user equipment, comprising:
    a processor; and
    a non-transitory computer readable medium including computer-executable instructions that, when executed by the processor, cause the user equipment to carry out a method comprising:
    receiving, in accordance with a configured timing relationship for the user equipment defining a preset time prior to a start time of a scheduling cycle, an indication field, from a base station on a first physical downlink control channel (PDCCH), wherein:
    the indication field comprises M bits
    the user equipment corresponds to K bits of the M bits,
    the K bits indicate whether the user equipment needs to receive downlink information from the base station within the scheduling cycle,
    M is a positive integer greater than 1, and
    K is a positive integer greater than 1 and less than M; and
    receiving, in accordance with a value of the K bits, downlink information from the base station within the scheduling cycle on a second PDCCH,
    wherein downlink information is scheduling information for scheduling the user equipment to receive uplink data or downlink data.

12. The user equipment according to claim 11, wherein, during the receiving, the user equipment is in a connected state.

13. The user equipment according to claim 11, wherein a type of the downlink information can be any one of the following:
   paging signaling,
   a random access response used to respond to an uplink random access request,
   signaling used to schedule the user equipment to receive downlink data, and
   signaling used to instruct the user equipment to send uplink data.

14. The user equipment according to claim 13, wherein the method comprises:
   determining that the downlink information is the paging signaling,
   determining, in accordance with the determining that the downlink information is the paging signaling, input information of K preset functions that comprises at least one of the group consisting of:
   an identifier of the user equipment, and
   system time information.

15. The user equipment according to claim 13, wherein the method comprises:
   determining that the downlink information is the random access response used to respond to an uplink random access request,
   determining, in accordance with the determining that the downlink information is the random access response, input information of K preset functions that comprises at least one of the group consisting of:
   identifier information in the random access request, and
   system time information.

16. A based station comprising:
   a processor; and
   a non-transitory computer-readable medium including computer-executable instructions that, when executed by the processor, cause the base station to carry out an information transmission method comprising:
   configuring a timing relationship for a user equipment, wherein the timing relationship defines a preset time prior to a start time of a scheduling cycle;
   sending, on a first physical downlink control channel (PDCCH), an indication field to the user equipment at the preset time prior to a-the start time of the scheduling cycle, wherein:
   the indication field comprises M bits,
   the user equipment corresponds to K bits of the M bits,
   the K bits indicate whether the user equipment needs to receive downlink information from the base station within the scheduling cycle,
   M is a positive integer greater than 1, and
   K is a positive integer greater than 1 and less than M; and
   sending, in accordance with a value of the K bits, the downlink information to the user equipment within the scheduling cycle on a-second PDCCH,
   wherein the downlink information is scheduling information for scheduling the user equipment to transfer uplink data or downlink data.

17. The base station according to claim 16, wherein the indication field is periodically sent, and
   wherein the indication field sending cycle is preset between the base station and the user equipment in a preconfigured or predefined manner.

18. The base station according to claim 16, wherein the user equipment is in a connected state.

* * * * *

UNITED STATES PATENT AND TRADEMARK OFFICE
CERTIFICATE OF CORRECTION

PATENT NO. : 11,350,384 B2
APPLICATION NO. : 16/831362
DATED : May 31, 2022
INVENTOR(S) : Tie et al.

It is certified that error appears in the above-identified patent and that said Letters Patent is hereby corrected as shown below:

In the Claims

Claim 16: Column 48, Line 12: "the present time prior to a-the start time of the scheduling" should read -- the present time prior to the start time of the scheduling --.

Signed and Sealed this
Eleventh Day of October, 2022

Katherine Kelly Vidal
*Director of the United States Patent and Trademark Office*